(12) United States Patent
Naik et al.

(10) Patent No.: US 11,132,172 B1
(45) Date of Patent: Sep. 28, 2021

(54) LOW LATENCY AUDIO DATA PIPELINE

(71) Applicant: Amazon Technologies, Inc., Seattle, WA (US)

(72) Inventors: Apoorv Naik, Carlsbad, CA (US); Samer A. Sarhan Hussein, Foothill Ranch, CA (US); Shubhashri Mohanty, Irvine, CA (US); Michael A Pogue, Sunnyvale, CA (US); Ali Tootoonchian, Irvine, CA (US); Nitin Arora, Carlsbad, CA (US); Victor Daniel Bazan, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/038,993

(22) Filed: Sep. 30, 2020

(51) Int. Cl.
| | |
|---|---|
| *G06F 17/00* | (2019.01) |
| *G06F 3/16* | (2006.01) |
| *G06F 16/64* | (2019.01) |
| *G10H 1/36* | (2006.01) |

(52) U.S. Cl.
CPC ............. *G06F 3/165* (2013.01); *G06F 16/64* (2019.01); *G10H 1/361* (2013.01)

(58) Field of Classification Search
CPC .......... G06F 3/165; G06F 16/64; G10H 1/361
See application file for complete search history.

(56) References Cited

U.S. PATENT DOCUMENTS

| | | | | |
|---|---|---|---|---|
| 2014/0358262 | A1* | 12/2014 | Yerrace ................... | G06F 3/165 700/94 |
| 2016/0057392 | A1* | 2/2016 | Meidan .......... | G06Q 10/063114 348/148 |
| 2020/0089464 | A1* | 3/2020 | Curtis ................ | H04N 21/4394 |

* cited by examiner

*Primary Examiner* — Joseph Saunders, Jr.
(74) *Attorney, Agent, or Firm* — Lee & Hayes, P.C.

(57) ABSTRACT

Systems and methods for low latency audio data pipelines are disclosed. For example, a software enabled access point is established for direct wireless communication between a microphone device and an electronic device. Additionally, an audio data processing pipeline that bypasses default data processing of an operating system stack of the electronic device is utilized. The audio data processing pipeline includes minimal audio data processing that writes audio data directly to hardware components for output of corresponding audio.

20 Claims, 10 Drawing Sheets

600

```
Send, to remote system, first audio data representing user utterance requesting use of
microphone device for voice input while device outputs first audio representing music
602
                                    ↓
Receive, from remote system: second audio data corresponding to first audio
representing music; and text data indicating words associated with music
604
                                    ↓
Display text corresponding to text data on screen
606
                                    ↓
Cause device to be configured as software enabled access point for wireless
communication with microphone device such that microphone device and device are
configured to communicate without one or more other devices wirelessly
communicating with device using software enabled access point
608
                                    ↓
Receive, utilizing software enabled access point, third audio data from microphone
device, third audio data representing voice input associated with text
610
                                    ↓
Generate fourth audio data from: third audio data processed utilizing data pipeline
configured to bypass at least portion of default audio processing applications
associated with operating system of device; and second data
612
                                    ↓
Output, utilizing fourth audio data, second audio representing music and voice input
614
```

FIG. 6

LOW LATENCY AUDIO DATA PIPELINE

BACKGROUND

Electronic devices may include microphones and be utilized to capture audio, while other electronic devices may include speakers and be utilized to output audio. These and other electronic devices may send and receive data using wireless networks. Described herein are improvements in technology and solutions to technical problems that can be used to, among other things, improve use of electronic devices to send and utilize data over wireless networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example process for low latency audio data pipelines.

DETAILED DESCRIPTION

Figure 1:
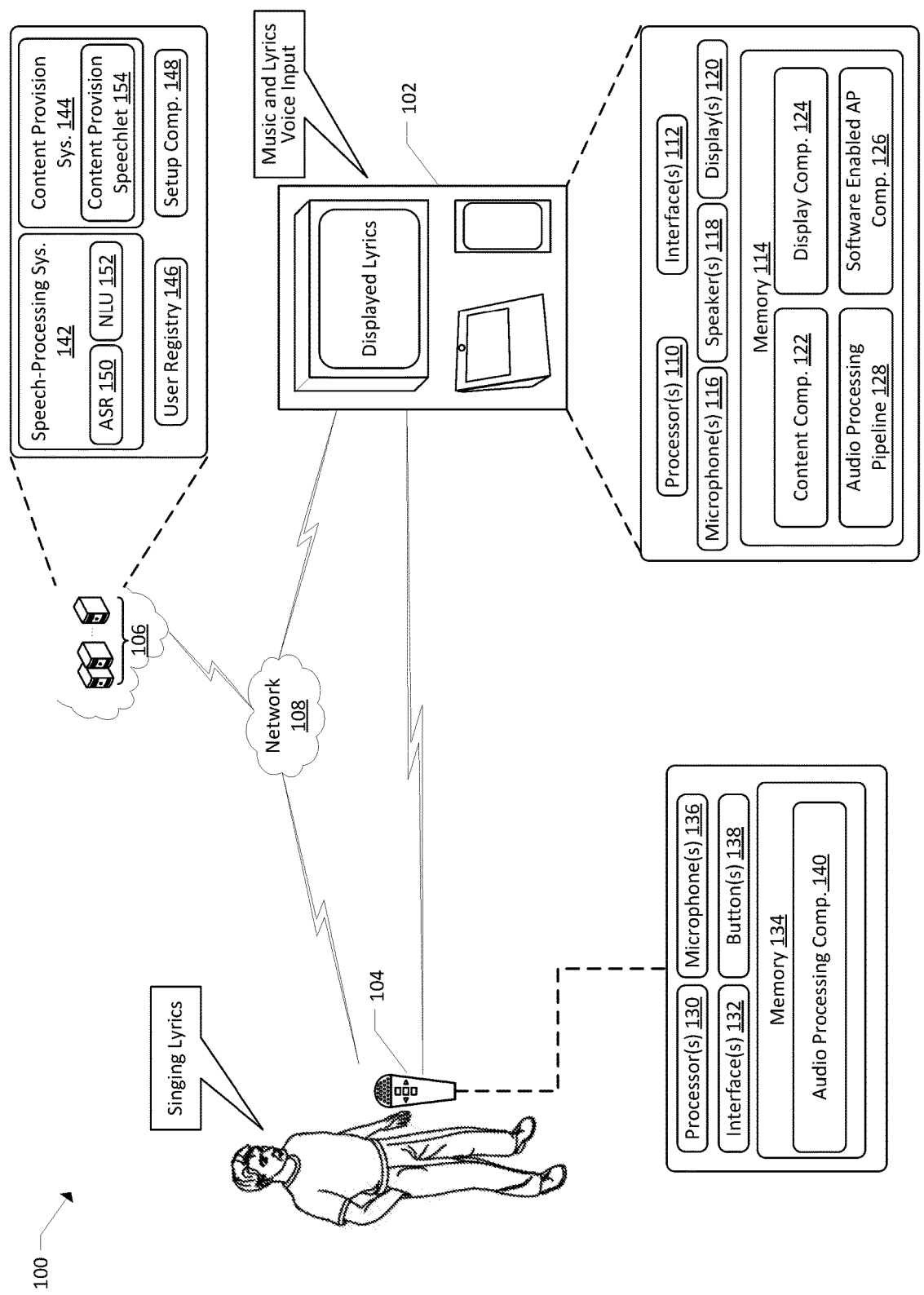
FIG. 1 illustrates a schematic diagram of an example environment for low latency audio data pipelines.

Systems and methods for low latency audio data pipelines are disclosed. Take, for example, an environment (such as a home, vehicle, office, store, restaurant, or other space) where one or more users may be present. The environments may include one or more electronic devices that may be utilized by the users. For example, the electronic devices may include voice interface devices (e.g., smart speaker devices, mobile phones, tablets, personal computers, automobiles, wearables (e.g., watches, rings, earbuds), televisions, appliances, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place a business, healthcare facility (e.g., hospital, doctor's office, pharmacy, etc.), in vehicle (e.g., airplane, truck, car, bus, etc.) in a public forum (e.g., shopping center, store, etc.), for example. The environments may also include one or more microphone devices, which may be any device that includes a microphones and that is configured to communicate with the one or more of the electronic devices.

A user may desire to utilize a microphone device to provide voice input and to have the electronic device associated with the microphone device output audio corresponding to the voice input along with other sound, such as music. By way of example, the user may desire to utilize the environment for karaoke, conference calling, etc. In these and other examples, the microphone device and the electronic device may be configured to communicate with each other such that latency in data processing between when the user providers the voice input to the microphone device and when the electronic device causes output of audio that includes the voice input and the other sound is minimized.

To do so, the microphone device may be acquired by the user. Acquisition of the microphone device may be achieved, for example, utilizing an online marketplace that offers the microphone device for sale, and/or through one or more other acquisition means. In examples, user profile data associated with the purchase of the microphone device, such as using the online marketplace, may be associated with the purchase such that a remote system associated with the online marketplace correlates a device identifier of the microphone device with the user profile data. A user may then turn on or otherwise enable the microphone device for first use. In some examples, the microphone device may be automatically associated with the user profile data and/or the network associated with the environment. For example, the microphone device and/or the remote system may utilize the user profile data to allow the microphone device to gain internet access and communicate with the remote system and/or one or more of the electronic device associated with the environment.

The user may then provide user input data indicating which electronic devices are to be associated with the microphone device. In examples, the user input data may be received via a user device, such as a phone, computer, tablet, etc. In other examples, the user input data may be received from the microphone device and/or the electronic devices. Data indicating which electronic device(s) are to be associated with the microphone device may be sent to the remote system, which may generate one or more commands to cause the microphone device to be associated with the electronic devices. For example, the remote system may send a command to the electronic device to establish a software enabled access point for communication with the microphone device. The software enabled access point may be configured such that the microphone device may wirelessly communicate directly with the electronic device, such as over a Wi-Fi network, without those communications being sent to other devices such as routers, other access points, etc. In examples, the software enabled access point may utilize a single-channel conference channel, which may allow for more data compaction for sending data from the microphone device to the electronic device. To establish the software enabled access point, the electronic device may send certification details to the microphone device to allow the microphone device to communicate in a secure manner with the electronic device. In examples, the remote system, in addition to sending the command to establish the software enabled access point to the electronic device, may send a command to the microphone device to connect to the software enabled access point, such as by utilizing the certification details outlined herein. At this point, when the microphone device sends data to the electronic device, such data is sent utilizing the software enabled access point, which may not allow other devices to utilize the access point while the microphone device and the electronic device are in communication.

Additionally, the electronic device and/or the remote system may be configured to enable and utilize one or more content provision applications to allow for provision of content. Such content may be output when voice input is received from the user. Utilizing the karaoke example, a content component of the remote system may acquire content indicated to be associated with a karaoke application. The content may include audio data representing music along with text data representing text to be displayed while the music is output. In examples, the electronic device and/or the microphone device may be utilized by the user to request that a karaoke session be started and identify songs to be utilized. In some examples, the remote system may query one or more karaoke applications to determine song options, and those options may be presented to the user. In other examples, the user's command may indicate which song is to be output. In examples where the electronic device includes a display, text corresponding to the text data may be displayed along with, in examples, an indication of which portions of the text are to be sung by the user at given times. In other examples, the electronic device may send the text data to another device with a screen to display the text. While the text is being displayed, the electronic device and/or another device having a speaker may output the music that is associated with the text.

The user may see the text as it is displayed, along with the indications of which portions of the text to sing at given times, and may provide voice input corresponding to the text to the microphone device. A microphone of the microphone device may capture the voice input and generate corresponding audio data. To do so, an audio processing component of the microphone device may generate audio data packets representing the voice input for sending to the electronic device. The audio processing component may perform hardware audio coding and send the resulting data to a pulse-code modulation (PCM) buffer. From the PCM buffer, a voice effects component of the microphone device may introduce one or more voice effects, such that alterations to the user's voice are perceived, and encoding may be performed, such as encoding. Forward erasure correction may be performed on the resulting encoded data, which may be temporarily stored in a buffer before being encrypted for sending to the electronic device. The encrypted data may be provided to a software enabled access point interface, which may send the audio data packets to the electronic device using the software enabled access point.

When received at the electronic device, an audio processing pipeline of the electronic device may process the audio data packets in a manner that differs from default audio data processing associated with an operating system of the electronic device. For example, the operating system of the electronic device may have various software, firmware, and/or hardware components, some of which may include their own buffers and processing logic, to process audio data and/or other data. However, the electronic device may be configured to bypass at least a portion of the operating system stack to allow for more expedient processing of the audio data from the microphone device. To do so, forward erasure correction processes may be performed on the audio data received from the microphone device, and the audio data may be decrypted and decoded. Packet loss concealment may be performed on the decoded and decrypted audio data, and a resampler may be utilized to change the sampling rate and/or number of channels utilized to process the audio data. A reverberation component may be utilized to introduce a reverberation effect to the voice input for purposes of audio gap concealment if data packets are lost, and the resulting data may be temporarily stored in a PCM sample buffer. The packets may be retrieved from the PCM sample buffer and may be ordered. For example, the protocol utilized to send the audio data packets may cause the audio data packets to be received out of order, and thus a reordering of the audio data packets is performed such that the packets are utilized correctly for outputting audio. A mixer is then utilized to associate the audio data representing the voice input from the microphone device with the audio data representing the music. In this way, the mixer allows for timing of the audio data streams to be synchronized, which in the karaoke example may allow for the audio representing the user's voice to be output at the same time that the music is output. The resulting data may be written to a hardware buffer for use in outputting audio representing both the voice input and the music. By utilizing the processes described above, the software enabled access point may reduce the latency in transmission of audio data packets from the microphone device to the electronic device. Additionally, by utilizing the audio processing pipeline described herein instead of processing audio data via the normal operating system stack, additional latency in data processing is removed. The result is that audio representing the voice input is output by the electronic device quickly and in such a way that the user perceives little to no delay between speaking words and hearing their voice output along with the music.

It should be understood that while a karaoke example is provided herein, the low latency audio data pipeline described herein may be utilized in other use cases, such as where the microphone device is utilized for voice input during a conference call, and audio from the conference call is output via the electronic device or another associated device. More generally, the operations described herein may be utilized in any example where voice input is provided to the microphone device, and audio representing the voice input along with other audio, such as from another device and/or system.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for low latency audio data pipelines. The system 100 may include, for example, electronic devices 102, which may include a communal device and/or a personal device. In certain examples, the electronic devices may be include voice interface devices (e.g., Echo devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). The system 100 may also include one or more microphone devices 104, which may be any device that includes a microphones and that is configured to communicate with the one or more electronic devices 102. In examples, the microphone device 104 may be a phone, headphones, earbuds, a tablet, and/or any other device with a microphone and wireless connection. The electronic devices 102 may also include one or more user devices, which may include electronic device having a screen configured to display information and receive user input. The electronic devices 102 and microphone devices 104 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The electronic devices 102 and/or microphone devices 104 may be configured to send data to and/or receive data from a remote system 106, such as via a network 108. Additionally, it should be understood that a given space and/or environment may include numerous electronic devices 102 and/or microphone devices 104. It should also be understood that when a "space" or "environment" is used herein, those terms mean an area and not necessarily a given room, building, or other structure, unless otherwise specifically described as such. It should be understood that the electronic device 102 may be a "headless" device that does not include a screen. In these and other examples, the electronic device 102 may perform one or more of the operations described herein with respect to providing low latency audio data pipelines, but for operations where display of information, such as text and/or images, is described, the electronic device 102 may communicate with another device that includes a screen and may cause that screen to display the described text and/or images.

The electronic devices 102 may include one or more components, such as, for example, one or more processors 110, one or more network interfaces 112, memory 114, one or more microphones 116, one or more speakers 118, and/or one or more displays 120. The microphones 116 may be configured to capture audio, such as user utterances, and generate corresponding audio data. The speakers 118 may be configured to output audio, such as audio corresponding to audio data received from another device and/or the system 104. The displays 120 may be configured to display images corresponding to image data and/or text corresponding to text data, such as image data and/or text data received from the remote system 106 and/or one or more other devices. It should be understood that while several examples used herein include a voice interface device that allows users to interact therewith via user utterances, one or more other devices, which may not include a voice interface, may be utilized instead of or in addition to voice interface devices. In these examples, the device may be configured to send and receive data over the network 108 and to communicate with other devices in the system 100. As such, in each instance where a voice interface device is utilized, a computing device that does not include a voice interface may also or alternatively be used. It should be understood that when voice interface devices are described herein, those voice interface devices may include phones, computers, and/or other computing devices. The memory 114 of the electronic devices 102 may include one or more components such as a content component 122, a display component 124, a software enabled access point component 126, and/or an audio processing pipeline 128. The components of the memory 114 of the electronic device 102 will be described in more detail below.

The microphone devices 104 may include one or more components, such as, for example, one or more processors 130, one or more network interfaces 132, memory 134, one or more microphones 136, and/or one or more buttons 138. The microphones 136 may perform the same or similar functions as the microphones 116, as described above. The buttons 138 may be associated with functionality that the microphone device 104 and/or the electronic device 102 performs when a user presses or otherwise selects the buttons 138. For example, the buttons 138 may be associated with commands, such as commands to increase and/or decrease volume, select content, progress through content, add voice effects to voice input, pause or stop or play content, provide a voice command, etc. It should be understood that while several commands have been provided herein, they are provided by way of example and not as a limitation. The memory 134 may include one or more components, such as an audio processing component 140. The audio processing 140 will be described in more detail below.

The remote system 106 may include components such as, for example, a speech-processing system 142, a content provision system 144, a user registry 146, and/or a setup component 148. It should be understood that while the speech-processing system 142 and the other components are depicted and/or described as separate from each other in FIG. 1, some or all of the components may be a part of the same system. The speech-processing system 142 may include an automatic speech recognition component (ASR) 150 and/or a natural language understanding component (NLU) 152. Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills. "Skills," as described herein may be applications and/or may be a subset of an application. For example, a skill may receive data representing an intent. For example, an intent may be determined by the NLU component 152 and/or as determined from user input via a computing device. Skills may be configured to utilize the intent to output data for input to a text-to-speech component, a link or other resource locator for audio data, and/or a command to a device, such as the electronic device 102.

In instances where a voice interface device is utilized, skills may extend the functionality of devices 102, 104 that can be controlled by users utilizing a voice-user interface. In some examples, skills may be a type of application that may be useable in association with microphone devices and may have been developed specifically to work in connection with given microphone devices. Additionally, skills may be a type of application that may be useable in association with the voice interface device and may have been developed specifically to provide given functionality to the voice interface device. In examples, a non-skill application may be an application that does not include the functionality of a skill. Skills, as described herein, may be a type of application that may be usable in association with voice interface devices and may have been developed specifically to work in connection with voice interfaces of voice interface devices. The application(s) may be configured to cause processor(s) to receive information associated with interactions with the voice interface device. The application(s) may also be utilized, in examples, to receive input, such as from a user of a microphone device 104 and/or the voice interface device and send data and/or instructions associated with the input to one or more other devices.

In examples, some or each of the components of the remote system 106 may include their own processor(s), network interface(s), and/or memory. As such, by way of example, the speech-processing system 142 may include and/or be associated with processor(s), network interface(s), and/or memory. The other components of the remote system 106, such as the content provision system 144, may include and/or be associated with different processor(s), network interface(s), and/or memory, or one or more of these components may utilize some or all of the same processor(s), network interface(s), and/or memory utilized by the speech-processing system 142. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 146 may be configured to determine and/or generate associations between users, user accounts, and/or devices. For example, one or more associations between user accounts may be identified, determined, and/or generated by the user registry 146. The user registry 146 may additionally store information indicating one or more applications and/or resources accessible to and/or enabled for a given user account. Additionally, the user registry 146 may include information indicating device identifiers, such as naming identifiers, associated with a given user account, as well as device types associated with the device identifiers. The user registry 146 may also include information indicating user account identifiers, naming indicators of devices associated with user accounts, and/or associations between devices, such as the devices 102, 104. The user registry 146 may also include information associated with usage of the devices 102, 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data. The user registry 146 may also include data indicating which voice interface devices are associated with given user account data and naming indicators of those voice interface devices.

The speech-processing system 142 may be configured to receive audio data from the devices 102, 104 and/or other devices and perform speech-processing operations. For example, the ASR component 150 may be configured to generate text data corresponding to the audio data, and the NLU component 152 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "let's play karaoke," the NLU component 152 may identify a "play" intent and the payload may be "karaoke." In this example where the intent data indicates an intent to start a karaoke session, the speech-processing system 142 may call one or more skills to effectuate the intent. Skills, as described herein may otherwise be described as applications and may include functionality for utilizing intent data to generate directives and/or instructions. For example, a karaoke skill may be called when the intent indicates that a karaoke session is to be initiated. The skill may be designated as being configured to handle the intent of facilitating a karaoke session, for example. The skill may receive the intent data and/or other data associated with the user utterance from the NLU component 152, such as by an orchestrator of the remote system 106, and may perform operations to instruct the device 102, 104 to output music and receive voice input for a karaoke session, for example.

The various components of the devices 102, 104, and the remote system 106 will now be described by way of example.

A user may desire to utilize the microphone device 104 to provide voice input and to have the electronic device 102 associated with the microphone device 104 output audio corresponding to the voice input along with other sound, such as music. By way of example, the user may desire to utilize the system 100 for karaoke, conference calling, etc. In these and other examples, the microphone device 104 and the electronic device 102 may be configured to communicate with each other such that latency in data processing between when the user provides the voice input to the microphone device 104 and when the electronic device 102 causes output of audio that includes the voice input and the other sound is minimized.

To do so, the microphone device 104 may be acquired by the user. Acquisition of the microphone device 104 may be achieved, for example, utilizing an online marketplace that offers the microphone device 104 for sale, and/or through one or more other acquisition means. In examples, user profile data associated with the purchase of the microphone device 104, such as using the online marketplace, may be associated with the purchase such that the remote system 106 associates a device identifier of the microphone device 104 with the user profile data. A user may then turn on or otherwise enable the microphone device 104 for first use. In some examples, the microphone device 104 may be automatically associated with the user profile data and/or the network associated with the environment. For example, the setup component 148 of the remote system 106 may be configured to receive an indication that the microphone device 104 is ready for setup and may provide credentials to the microphone device 104, such as via the network 108, for the microphone device 104 to connect to a local network of the system 100 and/or to communicate with the electronic devices 102. In examples, this process may not involve the user. In other examples, some level of user involvement may be provided, such as through a companion application on a user mobile device and/or through user input to the microphone device 104 and/or the electronic device 102.

The user may then provide user input data indicating which electronic devices 102 are to be associated with the microphone device 104. In examples, the user input data may be received via a user device, such as a phone, computer, tablet, etc. In other examples, the user input data may be received from the microphone device 104 and/or the electronic devices 102. In still other examples, the electronic device 102 and/or the remote system 106 may determine which electronic devices 102 to associate with the microphone device 104. In these examples, data indicating proximity between and/or signal strength associated with the microphone device 104 and the electronic devices 102 may be determined and utilized for identifying candidate electronic devices 102 to associate with the microphone device 104. Data indicating which electronic device(s) 102 are to be associated with the microphone device 104 may be sent to the remote system 106, which may generate one or more commands to cause the microphone device 104 to be associated with the electronic devices. For example, the setup component 148 may send a command to the electronic device 102 to establish a software enabled access point for communication with the microphone device 104. The software enabled access point may be configured such that the microphone device 104 may wirelessly communicate directly with the electronic device 102, such as over a Wi-Fi network, without those communications being sent to other devices such as routers, other access points, etc. In examples, the software enabled access point may utilize a single-channel conference channel, which may allow for more data compaction for sending data from the microphone device 104 to the electronic device 102. To establish the software enabled access point, the software enabled access point component 126 may receive the command from the remote system 106 and may send certification details to the microphone device 104 to allow the microphone device 104 to communicate in a secure manner with the electronic device 102. In examples, the remote system 106, in addition to sending the command to establish the software enabled access point to the electronic device 102, may send a command to the microphone device 104 to connect to the software enabled access point, such as by utilizing the certification details outlined herein. Utilizing this information, the software enabled access point component 126 may establish the software enabled access point for communication with the microphone device 104. At this point, when the microphone device 104 sends data to the electronic device 102, such data is sent utilizing the software enabled access point, which may not allow other devices to utilize the access point while the microphone device 104 and the electronic device 102 are in communication.

Additionally, the electronic device 102 and/or the remote system 106 may be configured to enable and utilize one or more content provision applications to allow for provision of content to be output when voice input is received from the user. Utilizing the karaoke example, the content component 122 may acquire content indicated to be associated with a karaoke application. The content may include audio data representing music along with text data representing text to be displayed on the display 120 while the music is output. In examples, the electronic device 102 and/or the microphone device 104 may be utilized by the user to request that a karaoke session be started and identification of songs to be utilized. In some examples, the remote system 106 may query one or more karaoke applications to determine song options, and those options may be presented to the user. As described herein, the user input to start a karaoke session may be in the form of a voice command. In these examples, the speech-processing system 142 may determine the intent to start the karaoke session, and the content provision system 144 may be called to assist in responding to the voice command. A content provision speechlet 154 of the content provision system 144 may be configured to receive the intent data and perform one or more actions to initiate the karaoke session and/or facilitate the karaoke session. In some examples, the user's command may indicate which song is to be output. In examples where the electronic device 102 includes a display 120, text corresponding to the text data may be displayed along with, in examples, an indication of which portions of the text are to be sung by the user at given times. In other examples, the electronic device 102 may send the text data to another device with a screen to display the text data. While the text is being displayed, the electronic device 102 and/or another device having a speaker may output the music that is associated with the text.

The user may see the text as it is displayed, along with the indications of which portions of the text to sing at given times, and may provide voice input corresponding to the text to the microphone device 104. The microphone 136 of the microphone device 104 may capture the voice input and generate corresponding audio data. To do so, the audio processing component 140 of the microphone device 104 may generate audio data packets representing the voice input for sending to the electronic device 102. The audio processing component 140 may perform hardware audio coding and send the resulting data to a pulse-code modulation (PCM) buffer. From the PCM buffer, a voice effects component of the microphone device 104 may introduce one or more voice effects, such that alterations to the user's voice are perceived, and encoding may be performed. Forward erasure correction may be performed on the resulting encoded data, which may be temporarily stored in a buffer before being encrypted for sending to the electronic device 102. The encrypted data may be provided to the network interface 132, which may send the audio data packets to the electronic device 102 using the software enabled access point.

When received at the electronic device 102, the audio processing pipeline 128 may process the audio data packets in a manner that differs from a default audio data processing associated with an operating system of the electronic device 102. For example, the operating system of the electronic device 102 may have various software, firmware, and/or hardware components, some of which may include their own buffers and processing logic, to process audio data and/or other data. However, the electronic device 102 may be configured to bypass at least a portion of the operating system stack to allow for more expedient processing of the audio data from the microphone device 104. To do so, the audio processing pipeline 128 may be utilized where forward erasure correction processes may be performed on the audio data received from the microphone device 104, and the audio data may be decrypted and decoded. Packet loss concealment may be performed on the decoded and decrypted audio data, and a resampler may be utilized to change the sampling rate and/or number of channels utilized to process the audio data. Then a reverberation component may be utilized to add a reverberation effect to the resulting data. The reverberation effect may be slight such that corresponding audio, when output, does not include much if any reverberation of the voice input. However, the reverberation effect may act to conceal and gaps in the audio data, such as from lost or late data packets sent between the microphone device 104 and the electronic device 102. By so doing, the forward erasure correction scheme that is utilized may allow for minimized stride schemes, such that the electronic device 102 does not need to wait for several other packets to arrive before trying to reconstruct a lost packet. Instead, the reverberation effect may at least partially mask the gap in audio caused by the lost packet. The resulting data may be temporarily stored in a PCM sample buffer, and the resulting data packets may be placed in order such that they are utilized for outputting audio in the correct order. For example, the protocol utilized to send the audio data packets may cause the audio data packets to be received out of order, and thus a reordering of the audio data packets is performed such that the packets are utilized correctly for outputting audio. A mixer is then utilized to associate the audio data representing the voice input from the microphone device 104 with the audio data representing the music. In this way, the mixer allows for timing of the audio data streams to be synchronized, which in the karaoke example may allow for the audio representing the user's voice to be output at the same time that the music is output. The resulting data may be written to a hardware buffer for use in outputting audio representing both the voice input and the music. By utilizing the processes described above, the software enabled access point may reduce the latency in transmission of audio data packets from the microphone device 104 to the electronic device 102. Additionally, by utilizing the audio processing pipeline 128 described herein instead of processing audio data via the normal operating system stack, additional latency in data processing is removed. The result is that audio representing the voice input is output by the electronic device 102 quickly and in such a way that users perceive little to no delay between speaking words and hearing their voice output along with the music.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104.

As shown in FIG. 1, several of the components of the remote system 106 and the associated functionality of those components as described herein may be performed by one or more of the devices 102, 104. Additionally, or alternatively, some or all of the components and/or functionalities associated with the devices 102, 104 may be performed by the remote system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110, 130, and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 130, and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the remote system 106 may possess its own local memory, which also may store program components, program data, and/or one or more operating systems.

The memory 114, 134, and/or the memory described with respect to the components of the remote system 106 may include volatile and nonvolatile memory, removable and non-removable media implemented in any method or technology for storage of information, such as computer-readable instructions, data structures, program component, or other data. Such memory 114, 134, and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 134, and/or the memory described with respect to the components of the remote system 106 may be implemented as computer-readable storage media ("CRSM"), which may be any available physical media accessible by the processor(s) 110, 130, and/or the processor(s) described with respect to the remote system 106 to execute instructions stored on the memory 114, 134, and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 134, and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112, 132, and/or the network interface(s) described with respect to the components of the remote system 106 may enable messages between the components and/or devices shown in system 100 and/or with one or more other polling systems, as well as other networked devices. Such network interface(s) 112, 132, and/or the network interface(s) described with respect to the components of the remote system 106 may include one or more network interface controllers (NICs) or other types of transceiver devices to send and receive messages over the network 108.

For instance, each of the network interface(s) 112, 132, and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 132, and/or the network interface(s) described with respect to the components of the remote system 106 may include a wide area network (WAN) component to enable message over a wide area network.

In some instances, the remote system 106 may be local to an environment associated the devices 102, 104. For instance, the remote system 106 may be located within one or more of the devices 102, 104. In some instances, some or all of the functionality of the remote system 106 may be performed by one or more of the devices 102, 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

Figure 2:
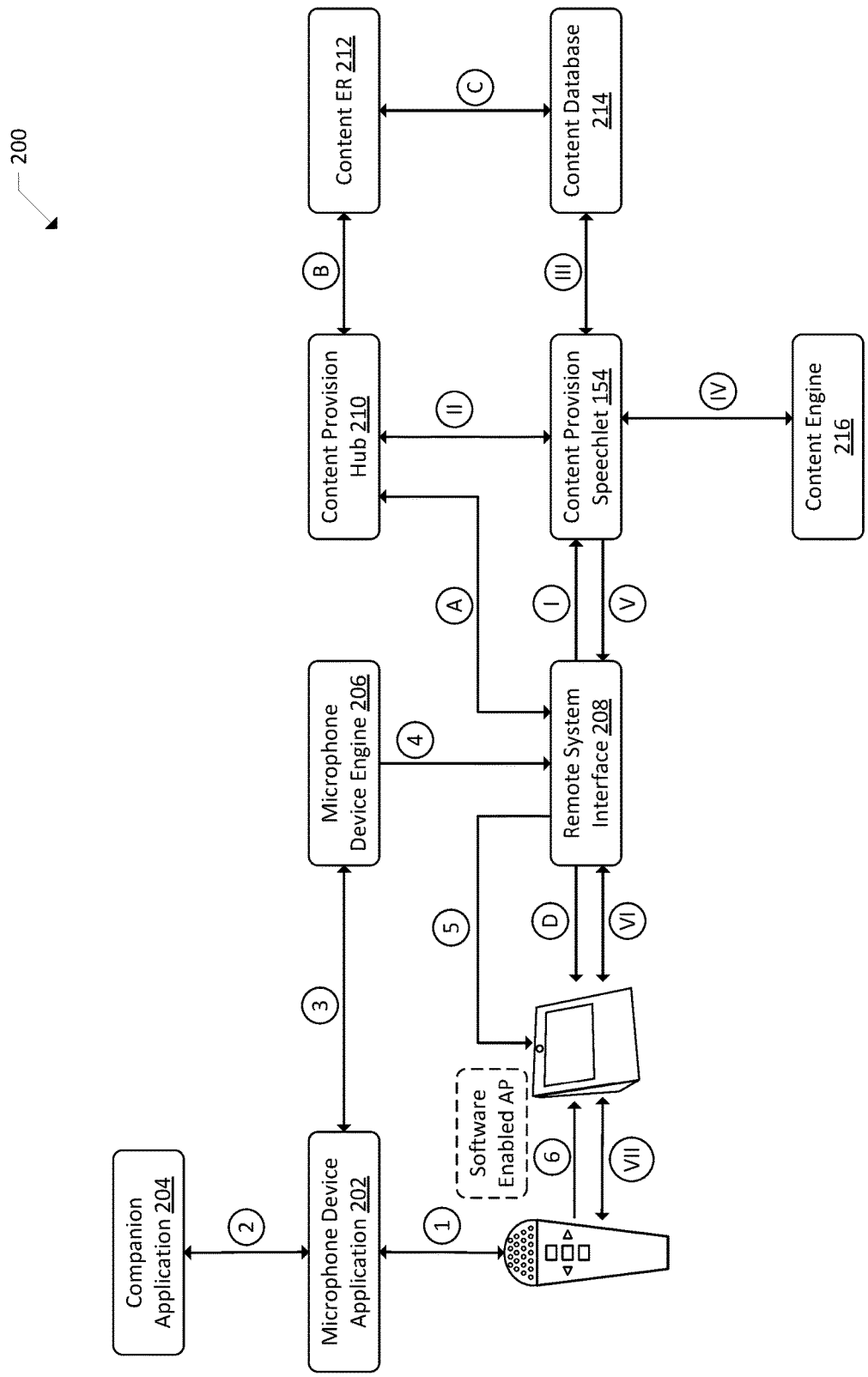
FIG. 2 illustrates a component diagram of example components associated with low latency audio data pipelines.

FIG. 2 illustrates a component diagram of example components associated with low latency audio data pipelines. The components are described by way of example and not as a limitation. Additionally, processes performed with respect to the components are described in steps 1-5, steps A-D, and steps I-VII. The order of some or all of these operations may differ from the example provided in FIG. 2. The component may include, for example, a microphone device 104, an electronic device 102, a microphone device application 202, a companion application 204, a microphone device engine 206, remote system interface 208, a content provision hub 210, a content entity recognition (ER) component 212, a content database 214, a content provision speechlet 154, and/or a content engine 216. Each of these components will be described in detail below.

For example, the microphone device 104 may include the same or similar components and perform the same or similar functions as described above with respect to FIG. 1. Additionally, the electronic device 102 may include the same or similar components and perform the same or similar functions as described above with respect to FIG. 1. First, configuration of the microphone device 104 and the electronic device 102 to communicate using a software enabled access point may be performed utilizing steps 1-5. At step 1, the microphone device 104 may initiate a setup process. For example, the microphone device 104 may gain access to the internet as described above and may send a request to be associated with the electronic device 102 and/or the local network associated with the electronic device 102. This request may be received at the microphone device application 202, which may be a component of a remote system associated with the electronic device 102. At step 2, the microphone device application 202 may receive user input data from the companion application 204, which may be stored or otherwise accessed by a personal device of a user. The user input data may indicate which electronic device 102 is to be associated with the microphone device 104. It should be understood that one, two, or more electronic devices 102 may be associated with the microphone device 104.

At step 3, the microphone device application 202 may initiate the sending of messages to the microphone device 104 and the electronic device 102 to associate the devices with each other and to establish a software enabled access point for the microphone device 104 to utilize for sending of audio data to the electronic device 102. The microphone device engine 206 may receive data indicating initiation of the association request by the microphone device application 202 and may query available microphone devices 104 and electronic devices 102 to determine if an association between such devices can be made. Data identifying the microphone device 104, the electronic device 102, and configuration information associated with the devices and the network to be utilized may be sent, at step 4, from the microphone device engine 206 to the remote system interface 208. The remote system interface 208 may be utilized to send commands to the electronic device 102 and/or the microphone device 104 to establish the software enabled access point. At step 5, a command may be sent to the electronic device 102 for the electronic device 102 to establish the software enabled access point. At step 6, the microphone device 104 may establish a connection with the electronic device 102 utilizing the software enabled access point. Once established, as described in more detail above, the microphone device 104 may be configured to send data to the electronic device 102 utilizing the software enabled access point. At this point, the software enabled access point has been established.

Next, a content discovery process may be performed at steps A-D. At step A, the remote system interface 208 may communicate with the content provision hub 210 with request data for information associated with available content that may be utilized. In some examples, the content is associated with one or more applications associated with the microphone device 104 and/or one or more applications indicated as being usable with the microphone device 104 and/or devices of a device type similar to the microphone device 104. These applications may include, for example, karaoke applications, conference call applications, and/or other applications where voice input from the microphone device 104 is to be output with other content on a different device from the microphone device 104. In some examples, the content discovery may be based at least in part on user input data, such as input data corresponding to user input requesting certain content and/or genres of content. In these and other examples, the content provision hub 210, at step B, may send the user input data to the content ER component 212, which may be utilized to determine a request associated with the user input data. The content ER component 212 may be configured to identify entities and/or other targets that are associated with intents to discover the content described herein and to correlate such targets to the user input data. The content ER component 212 may communicate, at step C, with the content database 214 to determine possible content that matches or otherwise corresponds to the determined targets. Entity recognition, as described here, is described in more detail with respect to FIG. 8, below. Once the requested or otherwise desired content is identified, at step D, the remote system interface 208 may surface the content and/or options associated with the content to the electronic device 102, such as for presentation and/or selection by a user.

Additionally, processes for utilizing content and the microphone device 104 may be performed, such as utilizing steps I-VII. At step I, user input data to initiate a content provision session may be received and the content provision speechlet 154 may be called to assist in initiating the content provision session, such as in situations where the user input data represents a voice command. In other examples where the user input data represents non-voice commands, a content provision application configured to accept graphical user interface input may be utilized. The content provision speechlet 154 may, at step II, request data indicate available content from the content provision hub 210, which may return possible content to correlate with the user request for content. At step III, the content provision speechlet 154 may communicate with the content database 214 to determine the availability and/or access ability of the content to the electronic device 102 and/or user profile data associated with the electronic device 102. At step IV, the content provision speechlet 154 may request an instance of the content data from the content engine 216, which may provide the content data. The content data may include audio data, text data, and/or image data as described herein, for example.

At step V, the content provision speechlet 154 may be utilized to send the content data to the electronic device 102, via the remote system interface 208. At step VI, the remote system interface 208 may provide the content data to the electronic device 102 along with one or more commands to cause the electronic device 102 output the content and/or to otherwise be configured to output the content and to perform operations associated with receipt of audio data from the microphone device 104. At step VII, audio data may be sent from the microphone device 104 to the electronic device 102 utilizing the software enabled access point. The electronic device 102 may output audio representing voice input from the microphone device 104 as well as from the content data from the remote system.

Figure 3:
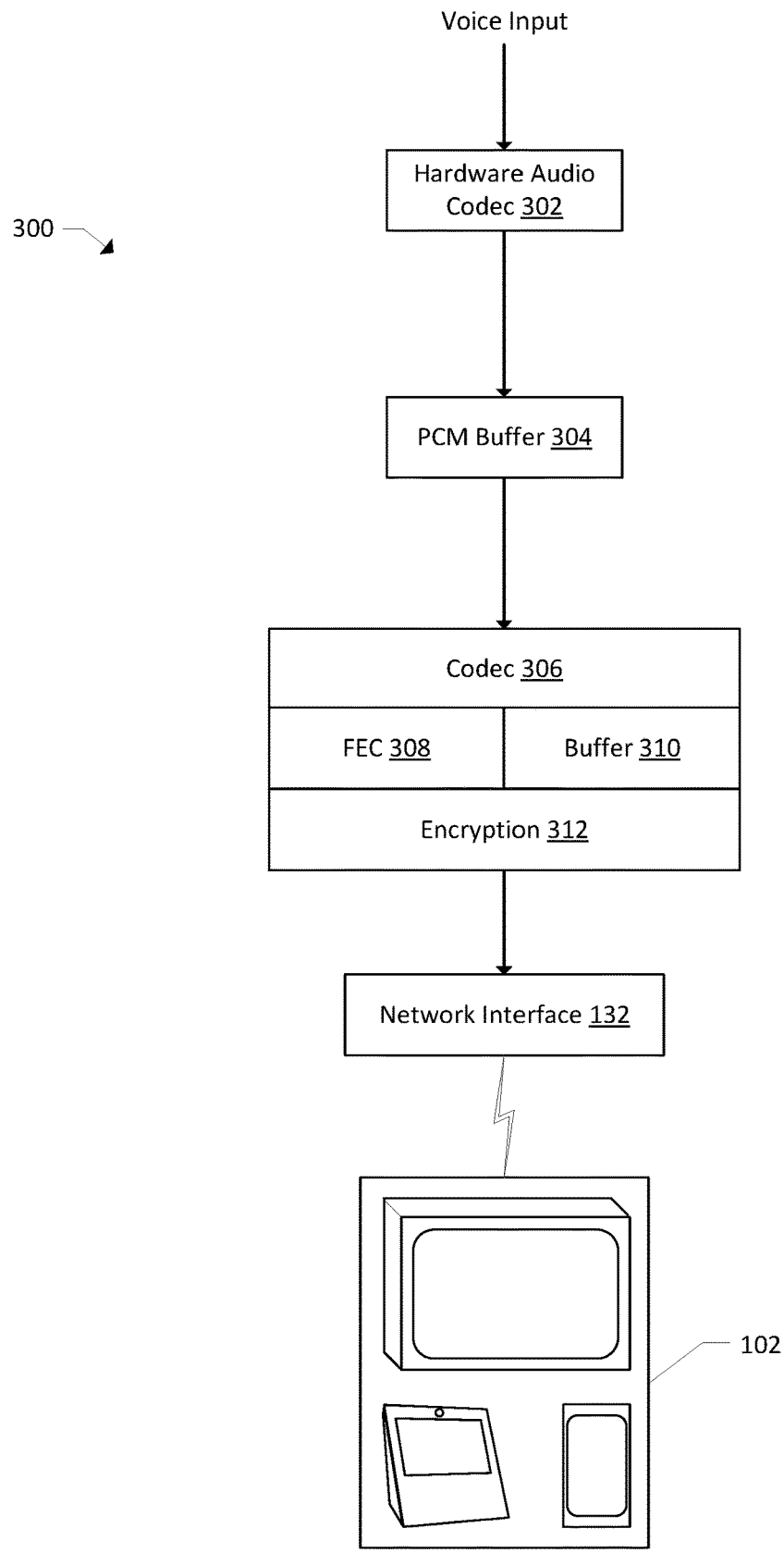
FIG. 3 illustrates a component diagram of example components of a microphone device utilized with low latency audio data pipelines.

FIG. 3 illustrates a component diagram of example components of a microphone device 104 utilized with low latency audio data pipelines. The components are described by way of example and not as a limitation. Each of these components will be described in detail below.

For example, the microphone device 104 may include one or more microphones that may be configured to capture audio from an environment, including audio representing voice input. Corresponding audio data may be generated by, for example, coding the audio utilizing a hardware audio codec 302. The resulting audio data may be sent from the hardware audio codec 302 to a pulse-code modulation (PCM) buffer 304. The PCM buffer 304 may be configured to digitally represent sampled analog signals corresponding to the audio using pulse-code modulation. For example, the amplitude of the audio signal may be sampled regularly at uniform intervals, and each sample may be quantized to the nearest value within a range of digital steps. From the PCM buffer 304, a codec 306 may be utilized to encode the audio data. The codec 306, which may be an opus codec, may be configured to encode speech and other audio in a single format, specifically a lossy audio coding format. The codec 306 may utilize one or more audio processing algorithms that are designed for processing speech and other algorithms designed for processing other audio, switch between and/or combining such algorithms as needed for increased processing efficiency, thereby reducing latency involved in audio processing. A forward erasure correction (FEC) component 308 may be utilized on the resulting data to introduce an FEC scheme for packet reconstruction when packets are lost. For example, the FEC scheme may include appending or otherwise including data from other packets in a given packet and/or duplicating packets such that attempts to reconstruct loss packets may be made at a receiving device. The audio data packets that are generated may be temporarily stored in a buffer 310 before being encrypted utilizing an encryption component 312 for sending to the electronic device 102. The encrypted data may be provided to a network interface 132, which may send the audio data packets to the electronic device 102 using the software enabled access point described herein.

Figure 4:
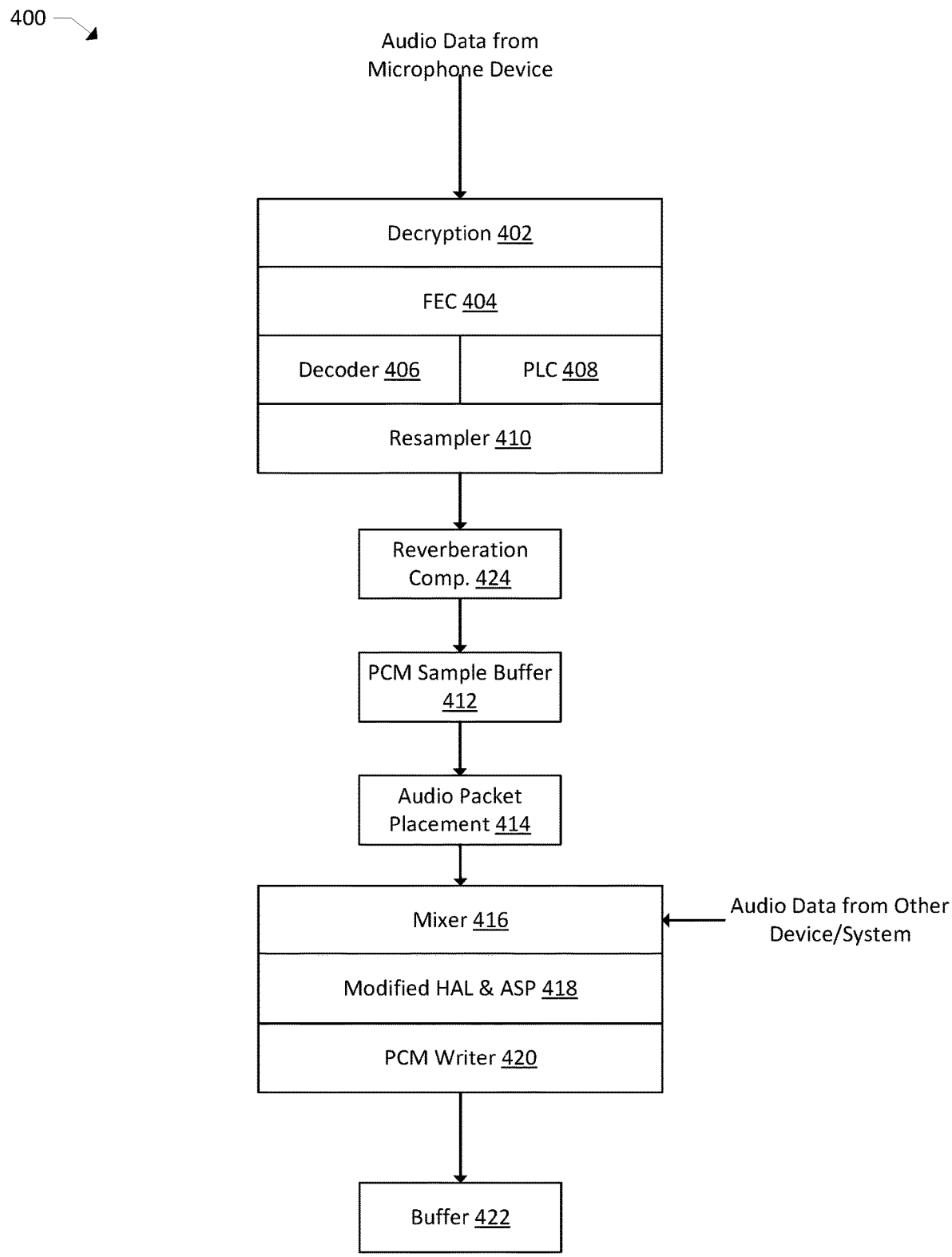
FIG. 4 illustrates a component diagram of example components of an electronic device utilized with low latency audio data pipelines.

FIG. 4 illustrates a component diagram of example components of an electronic device 102 utilized with low latency audio data pipelines. The components are described by way of example and not as a limitation. Each of these components will be described in detail below.

For example, audio data packets may be received from the microphone devices described herein at the electronic device 102. Audio data packets from the electronic device 102 may be received at a decryption component 402. The decryption component 402 may decrypt the audio data packets such that the audio data packets may be processed by additional components of the electronic device 102. A forward erasure correction component 402 of the electronic device 102 may receive the decrypted audio data packets and perform forward erasure correction operations associated with the transmission protocol used to transmit the packets to the electronic device 102.

A decoder 406 may decode the decrypted audio data packets utilizing, for example, opus-based algorithms. A packet loss concealer (PLC) 408 may be utilized to perform packet loss concealment operations. For example, the packet loss concealment operations may include masking the effects of packet loss in voice over IP communications. The PCL techniques may include zero insertion operations where the lost frames are replaced with zero (or otherwise no data), waveform substation where the missing gap is reconstructed by repeating a portion of already received audio, and/or model-based methods where a speech model configured to interpolate and extrapolate data gaps is utilized.

A resampler 410 may then be utilized for sample rate conversion where the sampling rate of a discrete signal is changed to obtain a new discrete representation of the underlying continuous signal. The resulting data may be provided to a reverberation component 424, which may be utilized to introduce a reverberation effect to the audio data. The reverberation effect may include the repeating of at least certain portions of the audio data. The reverberation effect may be utilized based at least in part on a user request to add reverberation as a voice effect. In other examples, the reverberation effect may be utilized to mask packet loss or otherwise to mask deficiencies in the audio data transmission and/or processing.

The resulting audio data packets may be sent to a PCM sample buffer 412, which may temporarily store the audio data packets as they are received and processed. These audio data packets may not be in order of how they were sent by the microphone device, such as in situations where the transfer protocol does not require sequential receipt of the data packets at the receiving device. In these examples, an audio packet placement component 414 may query the PCM sample buffer for audio data packets and may order the data packets based at least in part on a sequence number associated with each packet. For example, when the data packets are sent, the microphone device may add data indicating a sequence number for the packets. This information may be provided in a header portion of the packets. The sequence number may be utilized to reorder the packets at the electronic device 102.

Thereafter, a mixer 416 may be configured to associate the audio data representing the voice input from the microphone device with other audio data, such as the content data described herein as being received from the remote system. In this way, the mixer 416 allows for timing of the audio data streams to be synchronized, which in the karaoke example may allow for the audio representing the user's voice to be output at the same time that the music is output. In examples, the mixer 416 may generate a data packet that includes content from the microphone device 102 and content from the other data source. The resulting data may be utilized by a modified HAL and ASP component 418 for digital signal processing of the audio data. The processed data may be written to a buffer 422 utilizing a PCM writer 420 for use in outputting audio representing both the voice input and the music.

Figure 5:
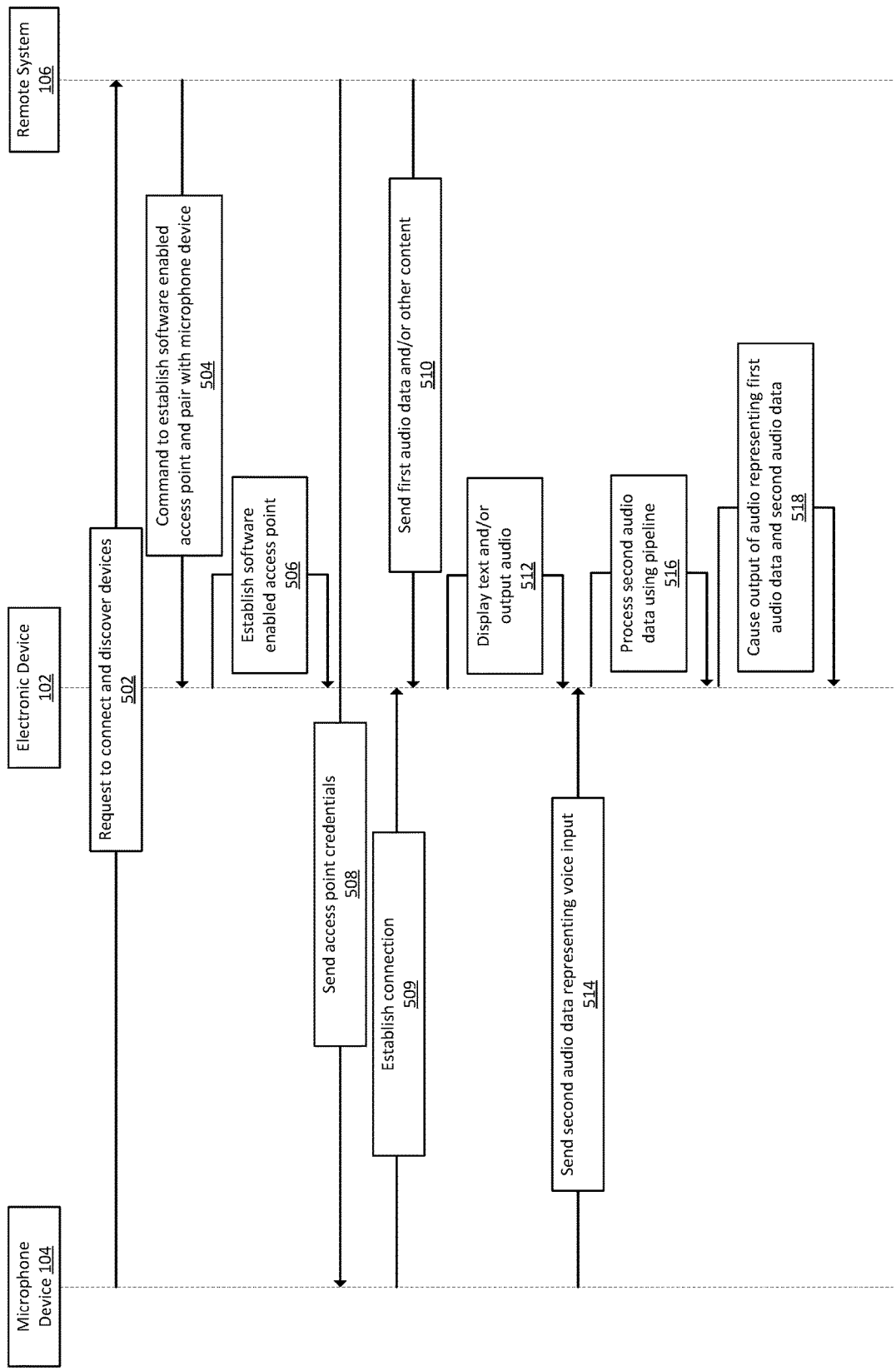
FIG. 5 illustrates a sequence diagram of an example process involving low latency audio data pipelines.

FIG. 5 illustrates a sequence diagram of an example process 500 involving low latency audio data pipelines. While the sequence diagram depicts the performance of operations and/or the transmission of certain data in a sequential manner, the operations may be performed in a different order than the order depicted in FIG. 5 and/or at least a portion of the operations may be performed in parallel.

At block 502, a microphone device 104 may send request data to connect to and/or discover devices to a remote system 106. For example, the microphone device 104 may be automatically associated with user profile data utilized to acquire the microphone device 104. The microphone device 104 and/or the remote system 106 may utilize the user profile data to allow the microphone device 104 to gain internet access and communicate with the remote system 106 and/or one or more of the electronic devices 102. The user may then provide user input data indicating which electronic devices 102 are to be associated with the microphone device 104. In examples, the user input data may be received via a user device, such as a phone, computer, tablet, etc. In other examples, the user input data may be received from the microphone device 104 and/or the electronic devices 102. Data indicating which electronic device(s) 102 are to be associated with the microphone device 104 may be sent to the remote system 106.

At block, 504, the remote system 106 may send a command to the electronic device 102 to establish a software enabled access point and pair with the microphone device 104. For example, the remote system 106 may generate one or more commands to cause the microphone device 104 to be associated with the electronic devices 102.

At block 506, the electronic device 102 may establish the software enabled access point for use by the microphone device in sending audio data to the electronic device 102. The software enabled access point may be configured such that the microphone device 104 may wirelessly communicate directly with the electronic device 102, such as over a Wi-Fi network, without those communications being sent to other devices such as routers, other access points, etc. In examples, the software enabled access point may utilize a single-channel conference channel, which may allow for more data compaction for sending data from the microphone device 104 to the electronic device 102.

At block 508, the remote system 106 may send access point credentials to the microphone device 104 to allow the microphone device to connect to and utilize the software enabled access point. To establish the software enabled access point, the remote system 106 may send certification details to the microphone device 104 to allow the microphone device 104 to communicate in a secure manner with the electronic device 102. In examples, the remote system 106, in addition to sending the command to establish the software enabled access point to the electronic device 102, may send a command to the microphone device 104 to connect to the software enabled access point, such as by utilizing the certification details outlined herein.

At block 509, the microphone device 104 may communicate with the electronic device 102 to establish a connection between the two devices utilizing the software enabled access point. At this point, when the microphone device 104 sends data to the electronic device 102, such data is sent utilizing the software enabled access point, which may not allow other devices to utilize the access point while the microphone device 104 and the electronic device 102 are in communication.

At block 510, the remote system 106 may send first audio data and/or other content data to the electronic device 102. For example, the user may request content, and a content provision system of the remote system 106 may provide content data corresponding to that content to the electronic device 102.

At block 512, the electronic device 102 may display text associated with text data sent by the remote system 106 that is associated with the content and/or may output audio corresponding to audio data received by the remote system. Utilizing the karaoke embodiment as an example, the content data may include audio data representing music and text data representing lyrics of the music. Text corresponding to the text data may be displayed, such as while the music is output.

At block 514, the microphone device 104 may send second audio data representing voice input to the electronic device 102. For example, voice input may be received at the microphone device 104, which may utilize the audio processing techniques described herein to generate the second audio data for sending to the electronic device 102 utilizing the software enabled access point.

At block 516, the electronic device 102 may process the second audio data using an audio processing pipeline configured to bypass one or more applications of an operating system stack of the electronic device 102. For example, when received at the electronic device 102, an audio processing pipeline of the electronic device 102 may process the audio data packets in a manner that differs from a default audio data processing associated with an operating system of the electronic device 102. The operating system of the electronic device may have various software, firmware, and/or hardware components, some of which may include their own buffers and processing logic, to process audio data and/or other data. However, the electronic device 102 may be configured to bypass at least a portion of the operating system stack to allow for more expedient processing of the audio data from the microphone device 104. To do so, forward erasure correction processes may be performed on the audio data received from the microphone device 104, and the audio data may be decrypted and decoded. Packet loss concealment may be performed on the decoded and decrypted audio data, and a resampler may be utilized to change the sampling rate and/or number of channels utilized to process the audio data. A reverberation effect may be added to the audio data and the resulting data may be temporarily stored in a PCM sample buffer, which may be utilized for rearranging the packets such that they are utilized for outputting audio in the correct order. For example, the protocol utilized to send the audio data packets may cause the audio data packets to be received out of order, and thus a reordering of the audio data packets is performed such that the packets are utilized correctly for outputting audio. A mixer is then utilized to associate the audio data representing the voice input from the microphone device 104 with the audio data representing the music.

At block 518, the electronic device 102 may cause output of audio representing the first audio data and the second audio data. For example, the mixer allows for timing of the audio data streams to be synchronized, which in the karaoke example may allow for the audio representing the user's voice to be output at the same time that the music is output. The resulting data may be written to a hardware buffer for use in outputting audio representing both the voice input and the music. By utilizing the processes described above, the software enabled access point may reduce the latency in transmission of audio data packets from the microphone device to the electronic device. Additionally, by utilizing the audio processing pipeline described herein instead of processing audio data via the normal operating system stack, additional latency in data processing is removed. The result is that audio representing the voice input is output by the electronic device quickly and in such a way that the user perceives little to no delay between speaking words and hearing their voice output along with the music.

Figure 7:
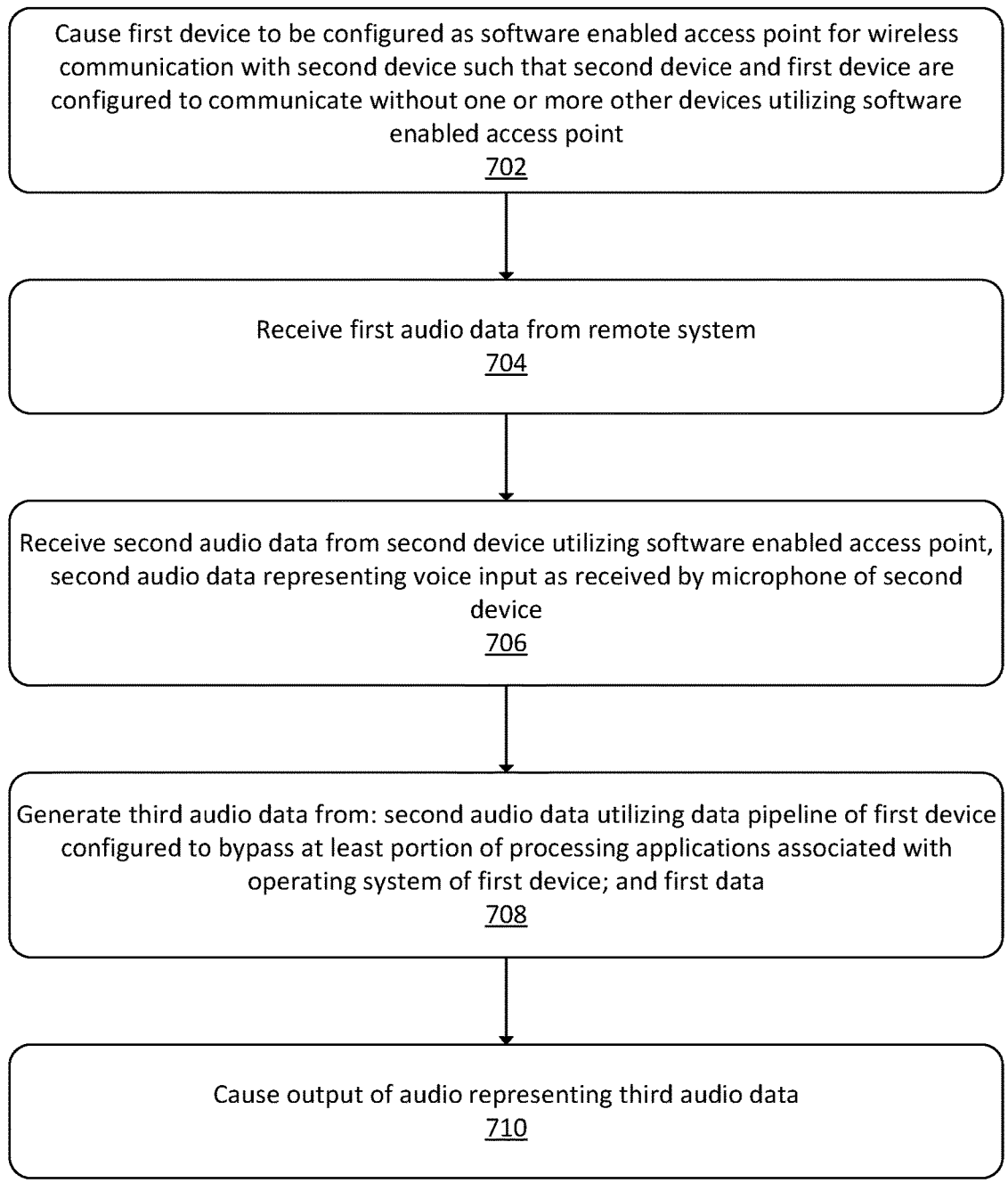
FIG. 7 illustrates a flow diagram of another example process for low latency audio data pipelines.

FIGS. 6 and 7 illustrate processes for low latency audio data processing. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5 and 8-10, although the processes may be implemented in a wide variety of other environments, architectures and systems.

FIG. 6 illustrates a flow diagram of an example process 600 for low latency audio data pipelines. The order in which the operations or steps are described is not intended to be construed as a limitation, and any number of the described operations may be combined in any order and/or in parallel to implement process 600.

At block 602, the process 600 may include sending, to a remote system, first audio data representing a user utterance requesting use of a microphone device for voice input while the device outputs first audio representing music. For example, a voice user interface may be utilized to receive audio representing the user utterance, and a speech-processing system may be utilized to process the corresponding audio data to determine intent data. The intent data may indicate a determined intent associated with the user utterance as well as a payload and/or value associated with the intent. For example, for a user utterance of "let's play karaoke," a NLU component may identify a "play" intent and the payload may be "karaoke." In this example where the intent data indicates an intent to start a karaoke session, the speech-processing system may call one or more skills to effectuate the intent.

At block 604, the process 600 may include receiving, from the remote system: second audio data corresponding to the first audio representing the music; and text data indicating words associated with the music. For example, content data may include the audio data and the corresponding text data. In other examples, the content data may be received from one or more devices and/or systems other than the remote system.

At block 606, the process 600 may include displaying text corresponding to the text data on a screen. For example, the device from which the voice command was received may have a display and in these examples the text may be displayed on that display. In other examples where such a device does not include a display and/or when a configuration of the device indicates that images and/or text are to be displayed on another device instead of the device in question, the text may be displayed on that other device.

At block 608, the process 600 may include causing the device to be configured as a software enabled access point for wireless communication with the microphone device such that the microphone device and the device are configured to communicate without one or more other devices wirelessly communicating with the device using the software enabled access point. For example, the software enabled access point may be configured such that the microphone device may wirelessly communicate directly with the electronic device, such as over a Wi-Fi network, without those communications being sent to other devices such as routers, other access points, etc. In examples, the software enabled access point may utilize a single-channel conference channel, which may allow for more data compaction for sending data from the microphone device to the electronic device.

The electronic device may send access point credentials to the microphone device to allow the microphone device to connect to and utilize the software enabled access point. To establish the software enabled access point, the electronic device may send certification details to the microphone device to allow the microphone device to communicate in a secure manner with the electronic device. In examples, the remote system, in addition to sending the command to establish the software enabled access point to the electronic device, may send a command to the microphone device to connect to the software enabled access point, such as by utilizing the certification details outlined herein. At this point, when the microphone device sends data to the electronic device, such data is sent utilizing the software enabled access point, which may not allow other devices to utilize the access point while the microphone device and the electronic device are in communication.

At block 610, the process 600 may include receiving, utilizing the software enabled access point, third audio data from the microphone device, the third audio data representing the voice input associated with the text. For example, voice input may be provided to the microphone device, which may generate audio data and send that audio data to the electronic device using the software enabled access point.

At block 612, the process 600 may include generating fourth audio data from: the third audio data processed utilizing a data pipeline configured to bypass at least a portion of default audio processing applications associated with an operating system of the device; and the second audio data. For example, when received at the electronic device, an audio processing pipeline of the electronic device may process the audio data packets in a manner that differs from a default audio data processing associated with an operating system of the electronic device. For example, the operating system of the electronic device may have various software, firmware, and/or hardware components, some of which may include their own buffers and processing logic, to process audio data and/or other data. However, the electronic device may be configured to bypass at least a portion of the operating system stack to allow for more expedient processing of the audio data from the microphone device. To do so, forward erasure correction processes may be performed on the audio data received from the microphone device, and the audio data may be decrypted and decoded. Packet loss concealment may be performed on the decoded and decrypted audio data, and a resampler may be utilized to change the sampling rate and/or number of channels utilized to process the audio data. The resulting data may be temporarily stored in a PCM sample buffer, and the resulting data packets may be placed in order such that they are utilized for outputting audio in the correct order. For example, the protocol utilized to send the audio data packets may cause the audio data packets to be received out of order, and thus a reordering of the audio data packets is performed such that the packets are utilized correctly for outputting audio. A mixer is then utilized to associate the audio data representing the voice input from the microphone device with the audio data representing the music. In this way, the mixer allows for timing of the audio data streams to be synchronized, which in the karaoke example may allow for the audio representing the user's voice to be output at the same time that the music is output. The resulting data may be written to a hardware buffer for use in outputting audio representing both the voice input and the music.

At block 614, the process 600 may include outputting, utilizing the fourth audio data, second audio representing the music and the voice input. For example, the audio may be output such that, in the karaoke example, the music may be playing while the user's voice input is output very near, approximately 70 milliseconds or less, from when the user spoke the voice input. By utilizing the processes described above, the software enabled access point may reduce the latency in transmission of audio data packets from the microphone device to the electronic device. Additionally, by utilizing the audio processing pipeline described herein instead of processing audio data via the normal operating system stack, additional latency in data processing is removed. The result is that audio representing the voice input is output by the electronic device quickly and in such a way that the user perceives little to no delay between speaking words and hearing their voice output along with the music.

Additionally, or alternatively, the process 600 may include decrypting the encrypted audio data packets such that decrypted audio data packets are generated. The process 600 may also include causing the decrypted audio data packets to be associated with a pulse-code modulation (PCM) sample buffer. The process 600 may also include causing the decrypted audio data packets to be sequentially ordered from the PCM sample buffer. The process 600 may also include causing audio data content from the decrypted audio data packets, as sequentially ordered, to be associated with the second audio data representing the music. In these examples, the second audio may correspond to the audio data content and the second audio data.

Additionally, or alternatively, the process 600 may include prior to causing the decrypted audio data packets to be associated with the PCM sample buffer, generating first data including an audible reverberation effect included with the voice input, wherein the audio data content includes the audible reverberation effect with the voice input. In these examples, outputting the second audio may include outputting the audio data content with the audible reverberation effect and the music without the audible reverberation effect.

Additionally, or alternatively, the process 600 may include receiving user input data indicating a voice effect to be applied to the voice input. The process 600 may also include, in response to the user input data and prior to causing the decrypted audio data packets to be associated with the PCM sample buffer, generating first data including the voice effect with the voice input, wherein the audio data content includes the voice effect with the voice input. In these examples, outputting the second audio may include outputting the audio data content with the voice effect and the music without the voice effect.

FIG. 7 illustrates a flow diagram of another example process 700 for low latency audio data pipelines. The order in which the operations or steps are described is not intended to be construed as a limitation, and any number of the described operations may be combined in any order and/or in parallel to implement process 700.

At block 702, the process 700 may include causing a first device to be configured as a software enabled access point for wireless communication with a second device such that the second device and the first device are configured to communicate without one or more other devices utilizing the software enabled access point. For example, the software enabled access point may be configured such that the microphone device may wirelessly communicate directly with the electronic device, such as over a Wi-Fi network, without those communications being sent to other devices such as routers, other access points, etc. In examples, the software enabled access point may utilize a single-channel conference channel, which may allow for more data compaction for sending data from the microphone device to the electronic device.

The electronic device may send access point credentials to the microphone device to allow the microphone device to connect to and utilize the software enabled access point. To establish the software enabled access point, the electronic device may send certification details to the microphone device to allow the microphone device to communicate in a secure manner with the electronic device. In examples, the remote system, in addition to sending the command to establish the software enabled access point to the electronic device, may send a command to the microphone device to connect to the software enabled access point, such as by utilizing the certification details outlined herein. At this point, when the microphone device sends data to the electronic device, such data is sent utilizing the software enabled access point, which may not allow other devices to utilize the access point while the microphone device and the electronic device are in communication.

At block 704, the process 700 may include receiving first audio data from a remote system. For example, content data may include the audio data and the corresponding text data. In other examples, the content data may be received from one or more devices and/or systems other than the remote system.

At block 706, the process 700 may include receiving second audio data from the second device utilizing the software enabled access point, the second audio data representing voice input as received by a microphone of the second device. For example, voice input may be provided to the microphone device, which may generate audio data and send that audio data to the electronic device using the software enabled access point.

At block 708, the process 700 may include generating third audio data from: the second audio data utilizing a data pipeline of the first device configured to bypass at least a portion of processing applications associated with an operating system of the first device; and the first audio data. For example, when received at the electronic device, an audio processing pipeline of the electronic device may process the audio data packets in a manner that differs from a default audio data processing associated with an operating system of the electronic device. For example, the operating system of the electronic device may have various software, firmware, and/or hardware components, some of which may include their own buffers and processing logic, to process audio data and/or other data. However, the electronic device may be configured to bypass at least a portion of the operating system stack to allow for more expedient processing of the audio data from the microphone device. To do so, forward erasure correction processes may be performed on the audio data received from the microphone device, and the audio data may be decrypted and decoded. Packet loss concealment may be performed on the decoded and decrypted audio data, and a resampler may be utilized to change the sampling rate and/or number of channels utilized to process the audio data. The resulting data may be temporarily stored in a PCM sample buffer, and the resulting data packets may be placed in order such that they are utilized for outputting audio in the correct order. For example, the protocol utilized to send the audio data packets may cause the audio data packets to be received out of order, and thus a reordering of the audio data packets is performed such that the packets are utilized correctly for outputting audio. A mixer is then utilized to associate the audio data representing the voice input from the microphone device with the audio data representing the music. In this way, the mixer allows for timing of the audio data streams to be synchronized, which in the karaoke example may allow for the audio representing the user's voice to be output at the same time that the music is output. The resulting data may be written to a hardware buffer for use in outputting audio representing both the voice input and the music.

At block 710, the process 700 may include causing output of audio representing the third audio data. For example, the audio may be output such that, in the karaoke example, the music may be playing while the user's voice input is output very near, approximately 70 milliseconds or less, from when the user spoke the voice input. By utilizing the processes described above, the software enabled access point may reduce the latency in transmission of audio data packets from the microphone device to the electronic device. Additionally, by utilizing the audio processing pipeline described herein instead of processing audio data via the normal operating system stack, additional latency in data processing is removed. The result is that audio representing the voice input is output by the electronic device quickly and in such a way that the user perceives little to no delay between speaking words and hearing their voice output along with the music.

Additionally, or alternatively, the process 700 may include decrypting the encrypted audio data packets such that decrypted audio data packets are generated. The process 700 may also include causing the decrypted audio data packets to be sequentially ordered and causing audio data content from the decrypted audio data packets, as sequentially ordered, to be associated with the first audio data. In these examples, the audio may correspond to the audio data content and the first audio data.

Additionally, or alternatively, the process 700 may include generating, from audio data content of the second audio data, audio data packets having an audible reverberation effect. In these examples, the audio may include the audio data content with the audible reverberation effect and the first audio data without the audible reverberation effect.

Additionally, or alternatively, the process 700 may include receiving input data indicating a voice effect to be applied to the second audio data. The process 700 may also include, based at least in part on the input data and at the first device, generating audio data packets having the voice effect. In these examples, causing output of the audio may include causing output of the audio data content with the voice effect and the first audio data without the voice effect.

Additionally, or alternatively, the process 700 may include receiving, from the remote system, fourth audio data to be included in at least a portion of the audio when output. The process 700 may also include generating fifth audio data from the fourth audio data utilizing the data pipeline. In these examples, the audio may correspond to the first audio data, the third audio data, and the fifth audio data.

Additionally, or alternatively, the process 700 may include performing the operations described above in the context of a conference call embodiment. In this example, a communication channel may be established between the first device and a remote device, the communication channel configured to allow for sending and receiving data between the first device and the remote device. The first audio data may represent first voice input received at the remote device, and the second audio data may represent second voice input received at the second device. Additionally, causing output of the audio may comprise causing the first device to output the audio corresponding to the first audio data and the third audio data using a speaker of the first device. The process 700 may also include sending the third audio data to the remote device.

Additionally, or alternatively, the process 700 may include receiving text data indicating words, the text data associated with the first audio data. The process 700 may also include causing display of text corresponding to the text data on a screen. In these examples, the first audio data may represent music and the second audio data may represent voice input corresponding to the text.

Additionally, or alternatively, the process 700 may include receiving request data to establish the software enabled access point with the second device. The process 700 may also include generating first data representing access point authorization credentials for establishing the software enabled access point. The process 700 may also include sending the first data to the second device for use by the second device in establishing the software enabled access point. In these examples, causing the first device to be configured as the software enabled access point may comprise causing the first device to be configured as the software enabled access point based at least in part on at least one of: receiving input data from the second device; or receiving a command to establish the software enabled access point from the remote system.

Additionally, or alternatively, the process 700 may include receiving audio representing a user utterance to utilize the second device to receive the voice input while the first device outputs audio content corresponding to the first audio data from the third device. The process 700 may also include generating fourth audio data representing the audio representing the user utterance. The process 700 may also include sending the fourth audio data to the third device and receiving, from the third device, a command configured to cause the first device and the second device to establish communication utilizing the software enabled access point. In these examples, receiving the second audio data from the second device utilizing the software enabled access point may be based at least in part on the command.

Figure 8:
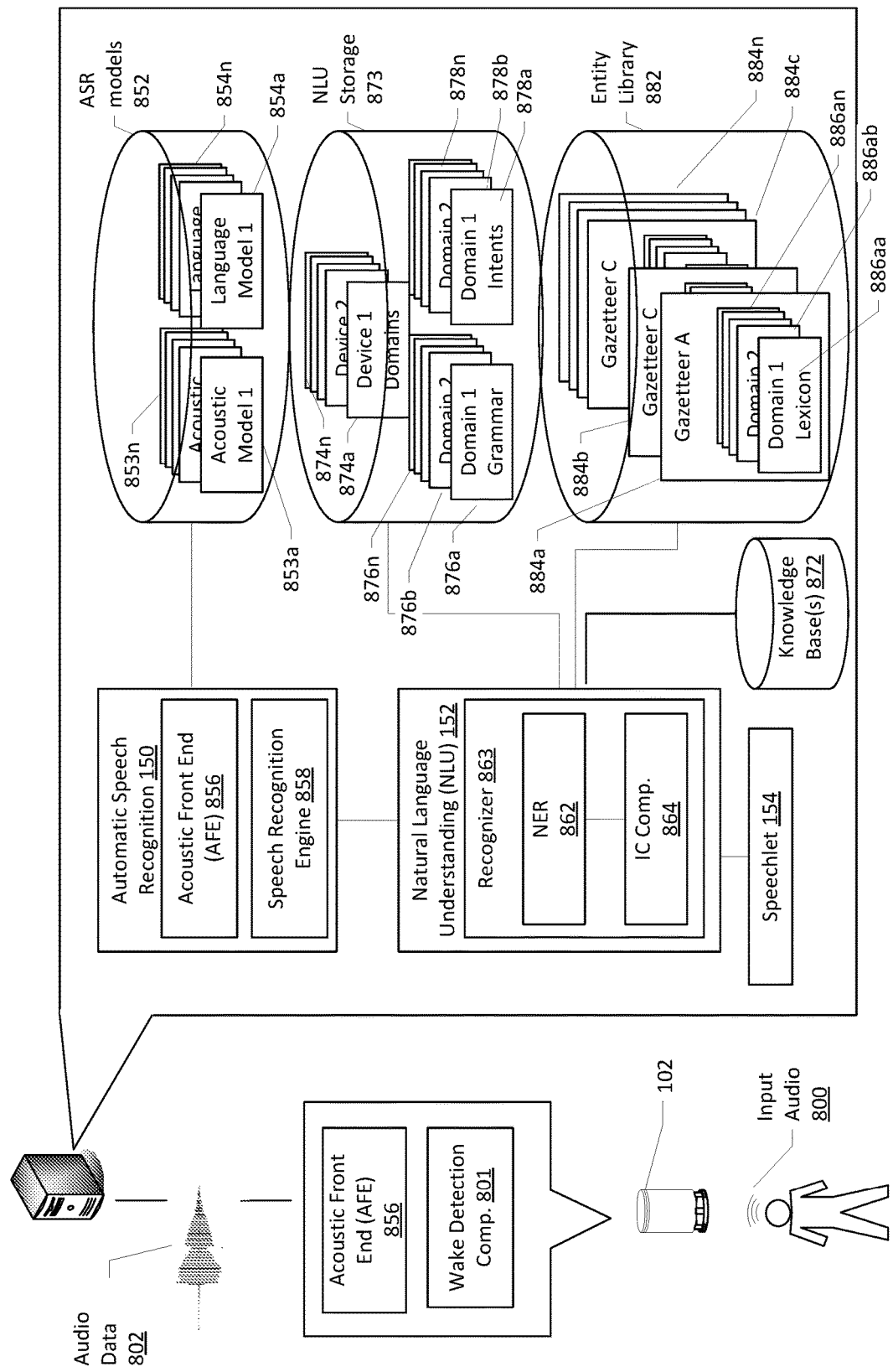
FIG. 8 illustrates a conceptual diagram of components of a speech-processing system for processing audio data provided by one or more devices.

FIG. 8 illustrates a conceptual diagram of components of a speech-processing system for processing audio data provided by one or more devices. FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 8 may occur directly or across a network 108. An audio capture component, such as a microphone 116 of the device 102, or another device, captures audio 800 corresponding to a spoken utterance. The device 102, using a wake word engine 801, then processes audio data corresponding to the audio 800 to determine if a keyword (such as a wakeword) is detected in the audio data. Following detection of a wakeword, the device 102 sends audio data 802 corresponding to the utterance to the remote system 106 that includes an ASR component 150. The audio data 802 may be output from an optional acoustic front end (AFE) 856 located on the device prior to transmission. In other instances, the audio data 802 may be in a different form for processing by a remote AFE 856, such as the AFE 856 located with the ASR component 150 of the remote system 106.

The wake word engine 801 works in conjunction with other components of the user device, for example a microphone to detect keywords in audio 800. For example, the device may convert audio 800 into audio data, and process the audio data with the wake word engine 801 to determine whether human sound is detected, and if so, if the audio data comprising human sound matches an audio fingerprint and/ or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 802 corresponding to input audio 800 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 802 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR component 150 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 150 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856) and transmit that information to a server across a network for ASR processing. Feature vectors may arrive at the remote system 106 encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play karaoke?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 858 may identify, determine, and/or generate text data corresponding to the user utterance, here "play karaoke."

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 152 (e.g., server 106) may include various components, including potentially dedicated processor(s), memory, storage, etc. As shown in FIG. 8, an NLU component 152 may include a recognizer 863 that includes a named entity recognition (NER) component 862 which is used to identify portions of query text that correspond to a named entity that may be recognizable by the system. A downstream process called named entity resolution links a text portion to a specific entity known to the system. To perform named entity resolution, the system may utilize gazetteer information (884a-884n) stored in entity library storage 882. The gazetteer information may be used for entity resolution, for example matching ASR results with different entities (such as voice interface devices, microphone devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 150 based on the utterance input audio 800) and attempts to make a semantic interpretation of the text. That is, the NLU process determines the meaning behind the text based on the individual words and then implements that meaning. NLU processing 152 interprets a text string to derive an intent or a desired action from the user as well as the pertinent pieces of information in the text that allow a device (e.g., device 102) to complete that action. For example, if a spoken utterance is processed using ASR 150 and outputs the text "play karaoke" the NLU process may determine that the user intended to initiate a karaoke session utilizing a microphone device.

The NLU 152 may process several textual inputs related to the same utterance. For example, if the ASR 150 outputs N text segments (as part of an N-best list), the NLU may process all N outputs to obtain NLU results.

As will be discussed further below, the NLU process may be configured to parse and tag to annotate text as part of NLU processing. For example, for the text "play karaoke," "play" may be tagged as a command (to initiate content output) and "karaoke" may be tagged as the category of the content to be output.

To correctly perform NLU processing of speech input, an NLU process 152 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 862 receives a query in the form of ASR results and attempts to identify relevant grammars and lexical information that may be used to construe meaning. To do so, the NLU component 152 may begin by identifying potential domains that may relate to the received query. The NLU storage 873 includes a database of devices (874a-874n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 864 parses the query to determine an intent or intents for each identified domain, where the intent corresponds to the action to be performed that is responsive to the query. Each domain is associated with a database (878a-878n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 864 identifies potential intents for each identified domain by comparing words in the query to the words and phrases in the intents database 878. In some instances, the determination of an intent by the IC component 864 is performed using a set of rules or templates that are processed against the incoming text to identify a matching intent.

In order to generate a particular interpreted response, the NER 862 applies the grammar models and lexical information associated with the respective domain to actually recognize a mention of one or more entities in the text of the query. In this manner, the NER 862 identifies "slots" or values (i.e., particular words in query text) that may be needed for later command processing. Depending on the complexity of the NER 862, it may also label each slot with a type of varying levels of specificity (such as noun, place, device name, device location, city, artist name, song name, amount of time, timer number, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC component 864 are linked to domain-specific grammar frameworks (included in 876) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (876) framework or frameworks may correspond to sentence structures such as "purchase item called 'Item A' from Marketplace A."

For example, the NER component 862 may parse the query to identify words as subject, object, verb, preposition, etc., based on grammar rules and/or models, prior to recognizing named entities. The identified verb may be used by the IC component 864 to identify intent, which is then used by the NER component 862 to identify frameworks. A framework for the intent of "play a song," meanwhile, may specify a list of slots/fields applicable to play the identified "song" and any object modifier (e.g., specifying a music collection from which the song should be accessed) or the like. The NER component 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazetteer for similarity with the framework slots. If the search of the gazetteer does not resolve the slot/field using gazetteer information, the NER component 862 may search the database of generic words associated with the domain (in the knowledge base 872). So, for instance, if the query was "identify this song," after failing to determine which song is currently being output, the NER component 862 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a skill 850. The destination skill 850 may be determined based on the NLU output. For example, if the NLU output includes a command to send a message, the destination skill 850 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the skill 850 may provide some or all of this information to a text-to-speech (TTS) engine. The TTS engine may then generate an actual audio file for outputting the audio data determined by the skill 850 (e.g., "okay," or "playing karaoke"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 152 during runtime operations where NLU operations are performed on text (such as text output from an ASR component 150). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC component 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 9:
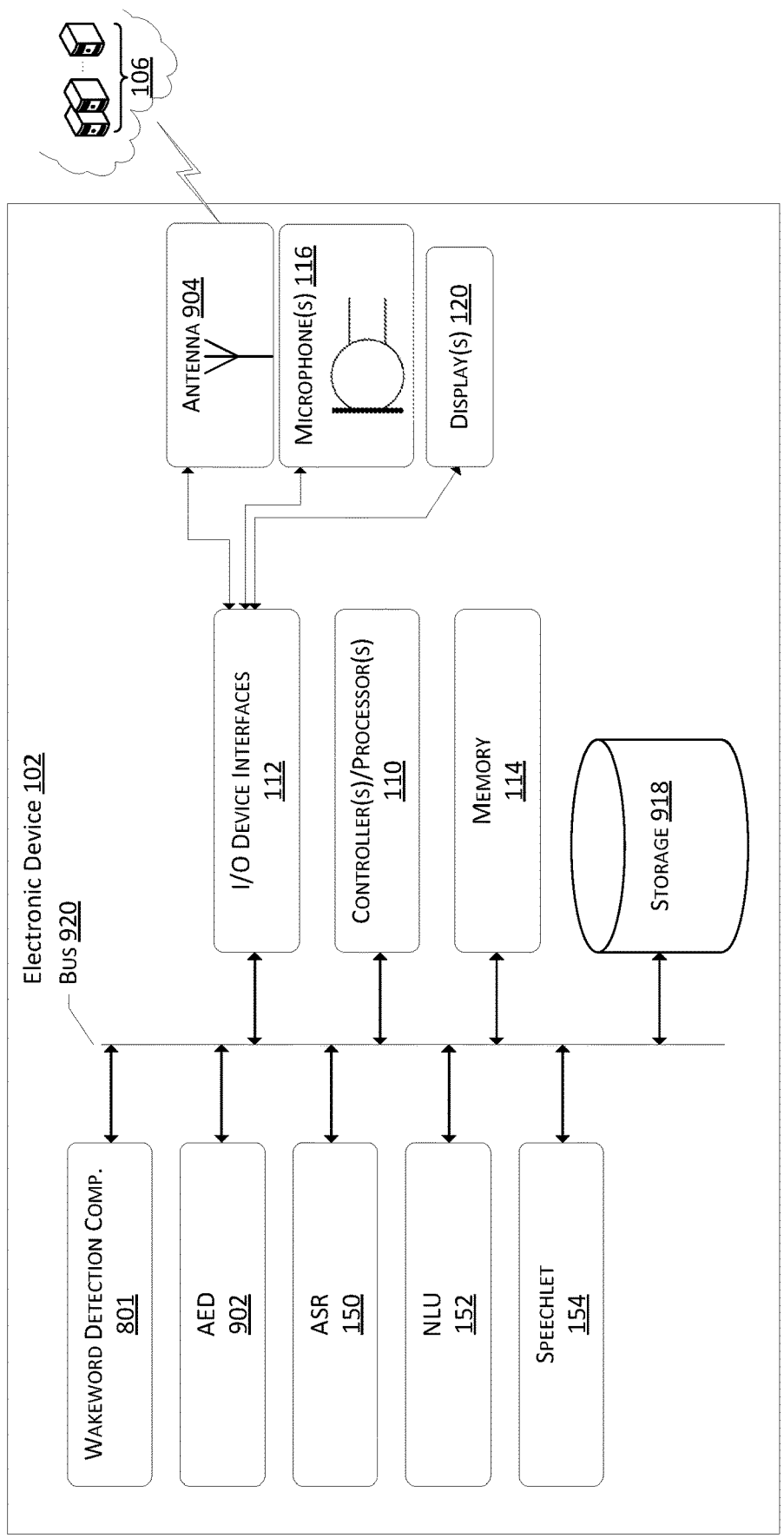
FIG. 9 illustrates a conceptual diagram of example components of an electronic device that may be utilized in association with low latency audio data pipelines.

FIG. 9 illustrates a conceptual diagram of example components of an electronic device that may be utilized in association with low latency audio data pipelines. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 116, a power source, and functionality for sending generated audio data via one or more antennas 1004 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 9 may include one or more controllers/processors 110, that may include a central processing unit (CPU) for processing data and computer-readable instructions, and memory 114 for storing data and instructions of the device 102. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as temporary "working" storage at runtime. A device's computer instructions may be stored in a non-transitory manner in non-volatile memory 114, storage 918, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 920 for conveying data among components of the respective device. Each component within a device 102 may also be directly connected to other components in addition to, or instead of, being connected to other components across the bus 920.

The device 102 may include a display 120, which may comprise a touch interface. Any suitable display technology, such as liquid crystal display (LCD), organic light emitting diode (OLED), electrophoretic, and so on, may be utilized for the displays 120. Furthermore, the processor(s) 110 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102.

The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 801, ASR component 150, etc.) may be configured to generate audio data corresponding to captured audio. The device 102 (using input/output device interfaces 112, antenna 904, etc.) may also be configured to transmit the audio data to the remote system 106 for further processing or to process the data using internal components such as a wakeword detection component 801.

Via the antenna(s) 904, the input/output device interface 112 may connect to one or more networks 108 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 108, the speech-processing system may be distributed across a networked environment. Accordingly, the device 102 and/or the remote system 106 may include an ASR component 150. The ASR component 150 of device 102 may be of limited or extended capabilities. The ASR component 150 may include language models stored in ASR model storage component, and an ASR component 140 that performs automatic speech recognition. If limited speech recognition is included, the ASR component 150 may be configured to identify a limited number of words, such as keywords detected by the device, whereas extended speech recognition may be configured to recognize a much larger range of words.

The device 102 and/or the remote system 106 may include a limited or extended NLU component 152. The NLU component 152 of device 102 may be of limited or extended capabilities. The NLU component 152 may comprise a name entity recognition module, an intent classification module and/or other components. The NLU component 152 may also include a stored knowledge base and/or entity library, or those storages may be separately located.

In examples, AED 902 may also be performed by the device 102. In these examples, the operations may include causing the AED component 902 to be enabled or otherwise turned on, or the operations may include causing the AED component 902 to transition from a first mode to a second mode representing a higher sensitivity to audio data generated by the microphone 116. The AED component 902 may utilize the audio data generated by the microphone 116 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 902 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 902 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the remote system 106 may also include speechlet 154 that is configured to execute commands/functions associated with a spoken command as described herein. The device 102 may include a wake word engine, which may be a separate component or may be included in an ASR component 150. The wakeword detection component 801 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) and may utilize speaker(s) of an external or peripheral device to output audio via the speaker(s) of the external/peripheral device.

Figure 10:
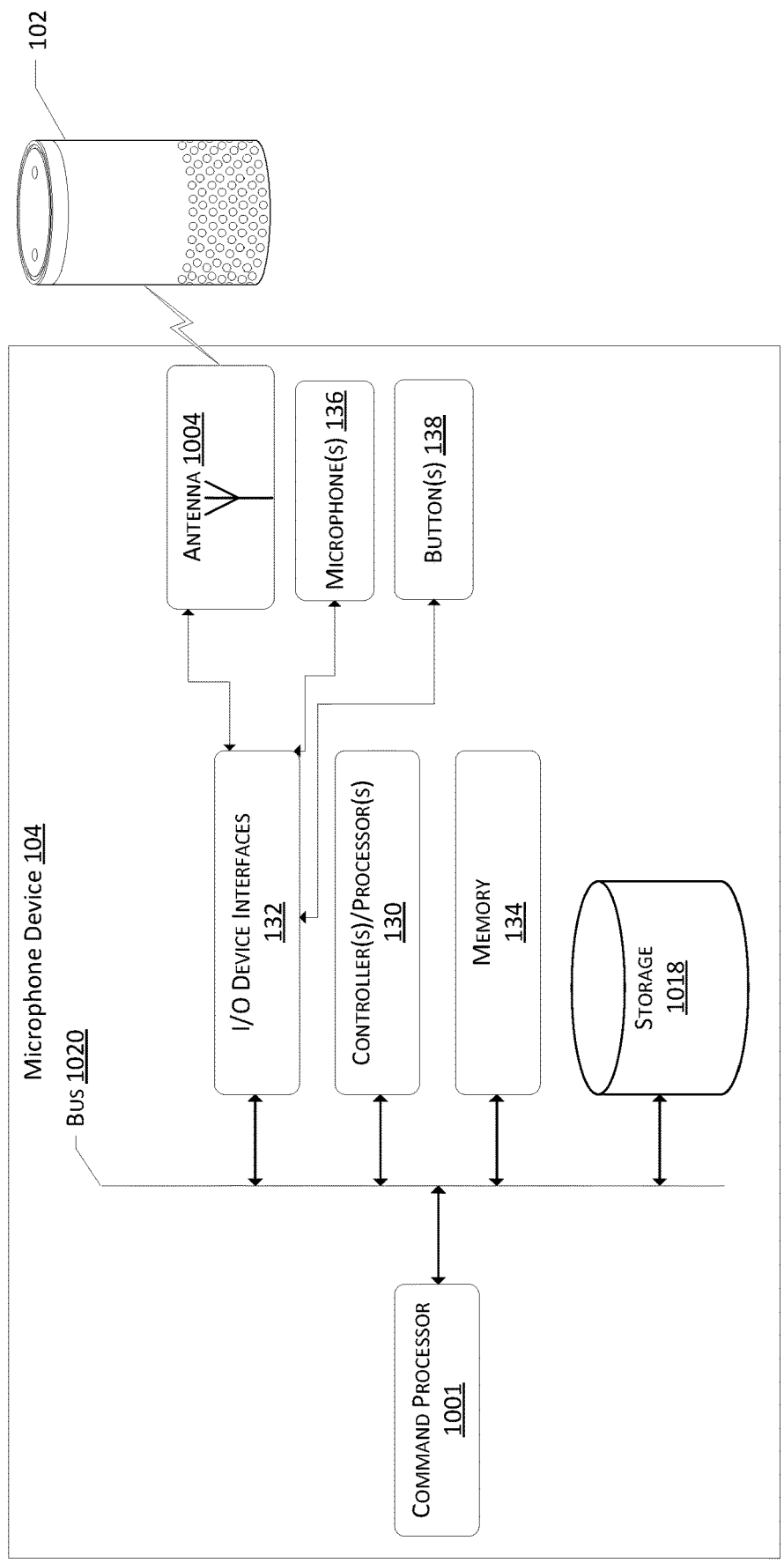
FIG. 10 illustrates a conceptual diagram of example components of a microphone device that may be utilized in association with low latency audio data pipelines.

FIG. 10 illustrates a conceptual diagram of example components of a microphone device that may be utilized in association with low latency audio data pipelines. For example, the device 104 may include a device that includes input means to receive voice input. The device 104 may be implemented as a standalone device that is relatively simple in terms of functional capabilities with limited input/output components, memory, and processing capabilities. For instance, the device 104 may not have a keyboard, keypad, touchscreen, or other form of mechanical input. In some instances, the device 104 may include a microphone 136, a power source, and functionality for sending generated audio data via one or more antennas 1004 to another device and/or system.

The device 104 of FIG. 10 may include one or more controllers/processors 130, that may include a central processing unit (CPU) for processing data and computer-readable instructions, and memory 134 for storing data and instructions of the device 104. In examples, the skills and/or applications described herein may be stored in association with the memory 134, which may be queried for content and/or responses as described herein. The device 104 may also be connected to removable or external non-volatile memory and/or storage, such as a removable memory card, memory key drive, networked storage, etc., through input/output device interfaces 132.

Computer instructions for operating the device 104 and its various components may be executed by the device's controller(s)/processor(s) 130, using the memory 134 as "working" storage at runtime. A device's computer instructions may be stored in a non-transitory manner in non-volatile memory 134, storage 1018, or an external device(s). Alternatively, some or all of the executable instructions may be embedded in hardware or firmware on the device 104 in addition to or instead of software.

The device 104 may include input/output device interfaces 132. A variety of components may be connected through the input/output device interfaces 132. Additionally, the device 104 may include an address/data bus 1020 for conveying data among components of the respective device. Each component within a device 104 may also be directly connected to other components in addition to, or instead of, being connected to other components across the bus 1020.

The device 104 may also include an audio capture component. The audio capture component may be, for example, a microphone 136 or array of microphones, a wired headset or a wireless headset, etc. The microphone 136 may be configured to capture audio. If an array of microphones is included, approximate distance to a sound's point of origin may be determined using acoustic localization based on time and amplitude differences between sounds captured by different microphones of the array. The device 104 (using input/output device interfaces 132, antenna 1004, etc.) may also be configured to transmit audio data to the remote system 106 and/or to the electronic device 102 for processing.

Via the antenna(s) 1004, the input/output device interface 132 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 104 via wired connection to an external alternating current (AC) outlet, and/or via onboard power sources, such as batteries, solar panels, etc.

The device 104 and/or the remote system 106 may also include a command processor 1001 that is configured to execute commands/functions as described herein. For example, one or more commands may be received by the device 104 from the remote system 106 and/or from another device such as a user device and/or the audio-input device. The command processor 1001 may receive the commands and utilize the components of the device 104 to process those commands. Such commands may cause the device 106 to output sound, such as via speakers.

The device 104 may also include one or more buttons 138. The buttons 138 may be associated with functionality that the microphone device 104 and/or the electronic device 102 performs when a user presses or otherwise selects the buttons 138. For example, the buttons 138 may be associated with commands, such as commands to increase and/or decrease volume, select content, progress through content, add voice effects to voice input, pause or stop or play content, provide a voice command, etc. It should be understood that while several commands have been provided herein, they are provided by way of example and not as a limitation.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A device, comprising:
   one or more processors; and
   non-transitory computer-readable media storing computer-executable instructions that, when executed by the one or more processors, cause the one or more processors to perform operations comprising:
      sending, to a remote system, first audio data representing a user utterance requesting use of a microphone device for voice input while the device outputs first audio representing music;
      receiving, from the remote system, second audio data corresponding to the first audio representing the music;
      causing the device to be configured as a software enabled access point for wireless communication with the microphone device such that the device is configured to communicate with the microphone device without one or more other devices wirelessly communicating with the device using the software enabled access point;
      receiving, utilizing the software enabled access point, third audio data from the microphone device, the third audio data representing the voice input, wherein the third audio data comprises encrypted audio data packets from the microphone device;
      processing the encrypted audio data packets utilizing a data pipeline configured to bypass at least a portion of default audio processing applications associated with an operating system of the device, the processing including:
         decrypting the encrypted audio data packets such that decrypted audio data packets are generated;
         the encrypted audio data packets such that decrypted audio data packets are generated;
         causing the decrypted audio data packets to be associated with a pulse-code modulation (PCM) sample buffer;
         causing the decrypted audio data packets to be sequentially ordered from the PCM sample buffer; and
         generating fourth audio data from:
            the decrypted audio data packets; and
            the second audio data; and
      outputting, utilizing the fourth audio data, second audio representing the music and the voice input.

2. The device of claim 1, the operations further comprising:
   receiving, from the remote system, text data associated with the music;
   causing text representing the text data to be output on a display while the second audio representing the music is output, wherein the voice input represents the text; and
   wherein processing the encrypted audio data packets utilizing the data pipeline configured to bypass the at least the portion of the default audio processing applications is in response to the third audio data being received utilizing the software enabled access point.

3. The device of claim 1, the operations further comprising:
   prior to causing the decrypted audio data packets to be associated with the PCM sample buffer, generating first data including an audible reverberation effect included with the voice input, wherein the fourth audio data includes the audible reverberation effect with the voice input; and
   wherein outputting the second audio includes outputting audio data content representing the voice input with the audible reverberation effect and the music without the audible reverberation effect.

4. The device of claim 1, the operations further comprising:
   receiving user input data indicating a voice effect to be applied to the voice input;
   in response to the user input data and prior to causing the decrypted audio data packets to be associated with the PCM sample buffer, generating first data including the voice effect with the voice input, wherein the fourth audio data includes the voice effect with the voice input; and
   wherein outputting the second audio includes outputting audio data content representing the voice input with the voice effect and the music without the voice effect.

5. A method, comprising:
   causing a first device to be configured as a software enabled access point for wireless communication with a second device such that the first device is configured to communicate with the second device without one or more other devices utilizing the software enabled access point;
   receiving first audio data from a third device;
   receiving second audio data from the second device utilizing the software enabled access point, the second audio data representing voice input as received by a microphone of the second device;
   processing the second audio data utilizing a data pipeline configured to bypass at least a portion of processing applications associated with an operating system of the first device, the processing including:
      decrypting the second audio data such that decrypted audio data packets are generated;
      causing the decrypted audio data packets to be associated with a pulse-code modulation (PCM) sample buffer;
      causing the decrypted audio data packets to be sequentially ordered from the PCM sample buffer; and
      generating third audio data from:
         the decrypted audio data packets; and
         the first audio data; and
   causing output of audio representing the third audio data.

6. The method of claim 5, further comprising:
   receiving audio representing a user utterance to utilize the second device to receive the voice input while the first device outputs audio content corresponding to the first audio data from the third device;
generating fourth audio data representing the audio representing the user utterance;
sending the fourth audio data to the third device;
receiving, from the third device, a command configured to cause the first device and the second device to establish communication utilizing the software enabled access point; and
wherein receiving the second audio data from the second device utilizing the software enabled access point is based at least in part on the command.

7. The method of claim 5, further comprising:
generating, from audio data content of the second audio data, audio data packets having an audible reverberation effect; and
wherein the audio includes the audio data content with the audible reverberation effect and the first audio data without the audible reverberation effect.

8. The method of claim 5, further comprising:
receiving input data indicating a voice effect to be applied to the second audio data;
based at least in part on the input data and at the first device, generating audio data packets having the voice effect; and
wherein causing output of the audio includes causing output of the audio data content with the voice effect and the first audio data without the voice effect.

9. The method of claim 5, further comprising:
receiving, from the third device, fourth audio data to be included in at least a portion of the audio when output;
generating fifth audio data from the fourth audio data utilizing the data pipeline; and
wherein the audio corresponds to the third audio data and the fifth audio data.

10. The method of claim 5, further comprising:
determining that a call has been established between the first device and a remote device, wherein the first audio data represents first voice input received at the remote device, the second audio data represents second voice input received at the second device, and, causing output of the audio comprises causing the first device to output the audio corresponding to the third audio data using a speaker of the first device; and
sending the third audio data to the remote device.

11. The method of claim 5, further comprising:
receiving text data indicating words, the text data associated with the first audio data;
causing display of text corresponding to the text data on a screen; and
wherein:
the first audio data represents music; and
the second audio data represents voice input representing the text.

12. The method of claim 5, further comprising:
receiving request data to establish the software enabled access point with the second device;
generating first data representing access point authorization credentials for establishing the software enabled access point;
sending the first data to the second device for use by the second device in establishing the software enabled access point; and
wherein causing the first device to be configured as the software enabled access point comprises causing the first device to be configured as the software enabled access point based at least in part on at least one of:
receiving input data from the second device; or
receiving a command to establish the software enabled access point from the third device.

13. A system, comprising:
one or more processors; and
non-transitory computer-readable media storing computer-executable instructions that, when executed by the one or more processors, cause the one or more processors to perform operations comprising:
causing the system to be configured as a software enabled access point for wireless communication with a first device such that the system is configured to communicate with the first device without one or more other devices utilizing the software enabled access point;
receiving first audio data from a second device;
receiving second audio data from the first device utilizing the software enabled access point, the second audio data representing voice input as received by a microphone of the first device;
processing the second audio data utilizing a data pipeline configured to bypass at least a portion of processing applications associated with an operating system of the system, the processing including:
decrypting the second audio data such that decrypted audio data packets are generated;
causing the decrypted audio data packets to be associated with a pulse-code modulation (PCM) sample buffer;
causing the decrypted audio data packets to be sequentially ordered from the PCM sample buffer; and
generating third audio data from:
the decrypted audio data packets; and
the first audio data; and
causing output of audio representing the third audio data.

14. The system of claim 13, the operations further comprising:
receiving audio representing a user utterance to utilize the first device to receive the voice input while the system outputs audio content corresponding to the first audio data from the second device;
generating fourth audio data representing the audio representing the user utterance;
sending the fourth audio data to the second device;
receiving, from the second device, a command configured to cause the system and the first device to establish communication utilizing the software enabled access point; and
wherein receiving the second audio data from the first device utilizing the software enabled access point is based at least in part on the command.

15. The system of claim 13, the operations further comprising:
generating, from audio data content of the second audio data, audio data packets having an audible reverberation effect; and
wherein the audio includes the audio data content with the audible reverberation effect and the first audio data without the audible reverberation effect.

16. The system of claim 13, the operations further comprising:
receiving input data indicating a voice effect to be applied to the second audio data;
based at least in part on the input data, generating audio data packets having the voice effect; and wherein causing output of the audio includes causing output of the audio data content with the voice effect and the first audio data without the voice effect.

17. The system of claim 13, the operations further comprising:
    receiving, from the second device, fourth audio data to be included in at least a portion of the audio when output;
    generating fifth audio data from the fourth audio data utilizing the data pipeline; and
    wherein the audio corresponds to the third audio data and the fifth audio data.

18. The system of claim 13, the operations further comprising:
    determining that a call has been established between the system and a remote device, wherein the first audio data represents first voice input received at the remote device, the second audio data represents second voice input received at the first device, and, causing output of the audio comprises causing the system to output the audio corresponding to the third audio data using a speaker of the system; and
    sending the third audio data to the remote device.

19. The system of claim 13, the operations further comprising:
    sending, to the second device, fourth audio data representing a user utterance requesting use of the first device for voice input;
    receiving text data indicating words, the text data associated with the first audio data;
    causing display of text corresponding to the text data on a screen; and
    wherein:
        the first audio data represents music; and
        the second audio data represents the voice input.

20. The system of claim 13, the operations further comprising:
    receiving request data to establish the software enabled access point with the first device;
    generating first data representing access point authorization criteria for establishing the software enabled access point;
    sending the first data to the first device for use by the first device in establishing the software enabled access point; and
    wherein causing the system to be configured as the software enabled access point comprises causing the system to be configured as the software enabled access point based at least in part on at least one of:
        receiving input data from the first device; or
        receiving a command to establish the software enabled access point from the second device.

* * * * *